US006064971A

United States Patent [19]

Hartnett

[11] Patent Number: 6,064,971

[45] Date of Patent: May 16, 2000

[54] ADAPTIVE KNOWLEDGE BASE

[76] Inventor: William J. Hartnett, 3831 E. Blanche St., Pasadena, Calif. 91107

[21] Appl. No.: 08/476,483

[22] Filed: Jun. 7, 1995

Related U.S. Application Data

[63] Continuation of application No. 08/436,219, filed as application No. PCT/US93/10557, Nov. 1, 1993.

[30] Foreign Application Priority Data

Oct. 30, 1992 [GB] United Kingdom .................. 9222884

[51] Int. Cl.[7] ............................ G06F 15/16; G06F 17/30

[52] U.S. Cl. .................................................. 705/7; 707/10

[58] Field of Search ........................... 707/4, 10; 705/10, 705/7; 395/200.49; 348/12; 706/45, 46

[56] References Cited

U.S. PATENT DOCUMENTS

| | | | |
|---|---|---|---|
| 4,688,195 | 8/1987 | Thompson et al. ....................... | 706/11 |
| 4,837,693 | 6/1989 | Schotz ........................................ | 705/4 |
| 4,870,579 | 9/1989 | Hey ........................................... | 705/27 |
| 4,930,072 | 5/1990 | Agrawal et al. ........................ | 707/101 |
| 4,953,085 | 8/1990 | Atkins ....................................... | 705/36 |
| 4,975,840 | 12/1990 | DeTore et al. .............................. | 705/4 |
| 5,041,972 | 8/1991 | Frost ......................................... | 705/10 |
| 5,101,353 | 3/1992 | Lupien et al. ............................. | 705/37 |
| 5,126,936 | 6/1992 | Champion et al. ....................... | 705/36 |
| 5,150,308 | 9/1992 | Hooper et al. .......................... | 364/489 |
| 5,191,638 | 3/1993 | Wakami et al. .......................... | 706/10 |
| 5,241,621 | 8/1993 | Smart ....................................... | 706/46 |
| 5,257,185 | 10/1993 | Farley et al. ............................ | 707/100 |
| 5,262,942 | 11/1993 | Earle ......................................... | 705/37 |
| 5,283,856 | 2/1994 | Gross et al. .............................. | 706/45 |

FOREIGN PATENT DOCUMENTS

| | | | |
|---|---|---|---|
| 3830326 | 3/1990 | Germany ........................ | G06F 15/21 |

OTHER PUBLICATIONS

Roos, J.L., "SAM: A Knowledge–Based System for Modeling an Economist", NATO Conference Proceedings, Hamburg, Germany, Sep. 3, 1989–Sep. 5, 1989, NATO ASI Series, F61, pp. 407–417.

APS Manual, published Mar. 1991, revised Nov. 1992, pp. vi, 1–4 to 1–6, and 3–1 to 3–29.

Gottinger, H.W., "Artificial Intelligence and Economic Modeling", Expert Systems, 8(2):99–105 (May 1991).

Danchey, A., "Information Technologies in the Transition to the Market Economy: The Case of Latecomer" European Journal of Information Systems, (Mar. 1991), Abstract.

Krutchen, D., "An Expert Financial Portfolio Management Advisory System", Second International Expert Systems Conference, Learned Information, Oxford, England, Sep. 30, 1986–Oct. 2, 1986 Abstract.

Rivieère, P. et al., "Using Expert System as an Aid to Producing Realistic Economic Forecasts", Expersvs–91 (Conference), Oct. 10, 1991–Oct. 11, 1991, pp. 111–116.

(List continued on next page.)

*Primary Examiner*—Robert W. Downs

[57] ABSTRACT

A method to operate a computerized adaptive knowledge base. The contents and organization of the adaptive knowledge base evolve based on the contributions and evaluations of a user community. Whether a particular set of contents or an alternative organization is preserved for future iterations is a function of user evaluations, taking into account the amounts of information and the relative importance of content vis-a-vis organization. Items of the adaptive knowledge base which are as yet unevaluated by a particular user are ranked by estimating that user's evaluations, based on other items for which evaluations are available to compare with other users. For example, evaluations are estimated from regressions with other users, weighted by functions of the correlation coefficients, the number of observations in common, and the significance of those observations for the particular user in the sense that their evaluation differs from the mean evaluation.

14 Claims, 7 Drawing Sheets

OTHER PUBLICATIONS

Dolk, D.R. et al., "An Active Modeling System for Econometric Analysis", Decision Support Systems, 7(4):315–328 (1991).

H.E. Bussey, et al., "Service Architecture, Prototype Description, and Network Implications of a Personalized Information Grazing Service," Proc. IEEE Ninth Annual Joint Conf. of the IEEE Computer and Communication Societies, vol. 3, pp. 1046–1053, Jun. 1990.

M. Scardamalia and C. Bereiter, "An Architecture for Collaborative Knowledge Building," Proc. of the NATO Advanced Research Workshop, pp. 41–66, Sep. 1990.

F. Staes, et al., "A Graphical Query Language for Object Oriented Databases," Proc. 1991 IEEE Workshop on Visual Languages, pp. 205–210, Oct. 1991.

E.L. Appleton, "Smart document retrieval (Verity Inc.'s TOPIC document retrieval software," Datamation, vol. 38(2), p. 20(4), Jan. 1992.

J.B. Hampshire, II and J.W. Strohbehn, "Tobit Maximum–Likelihood Estimation for Stocastic Time Series Affected by Receiver Saturation," IEEE Trans. on Information Theory, vol. 38(2), pp. 457–469, Mar. 1992.

G. Lawton, "Personal Library releases PL/MAC," MacWeek, vol. 6(26), p. 27, Jul. 1992.

B.M. Lange, "OMNI: A Corporate Knowledge Environment for Collaborative Work," IEEE Int'l. Conf. on Systems, Man and Cybernetics, pp. 949–953, Oct. 1992.

B. Lawrence and L. Radosevich, "Sharing data . . . and ideas," Lotus, vol. 8(10), p. 23(4), Oct. 1992.

L.S. Speigel, "Expanding brain bandwidth," LAN Technology, vol. 8(12), p. 39(4), Nov. 1992.

Y.I. Liou, "Collaborative Knowledge Acquisition," Expert Systems with Applications, vol. 5, pp. 1–13, Dec. 1992.

N.J. Belkin and W.B. Croft, "Information filtering and information retrieval: Two sides of the same coin?" Comm. ACM, vol. 35(12), p. 29(10), Dec. 1992.

S. Loeb, "Architecting personalized delivery of media information," Comm. ACM, vol. 35(12), p. 39(10), Dec. 1992.

ADAPTIVE KNOWLEDGE BASE

This is a continuation of application Ser. No. 08/436,219, filed Nov. 1, 1993, which is a 371 of PCT/US93/10557 filed under the revised title 'Privatization Marketplace'.

FIELD OF THE INVENTION

The present invention is generally related to the fields of information technology and market economics. The invention is more particularly related to computerized tools and methods useful for achieving a successful market economy. Yet more particularly, the present invention is related to tools and methods useful for privatizing, or transferring from state ownership to individual ownership, large state enterprises in newly democratic nations.

BACKGROUND OF THE INVENTION

Among the many tasks necessary to create a successful new world order, after the events of the past several years in Eastern Europe and the former Soviet Union, it will be necessary to transfer ownership rights in substantial portions of some countries' vast state-owned capital stock into private hands. In such countries, as well as others currently lacking effective owner shares markets, it may be desirable to develop policies and tools for operating such owner shares markets. Methods, tools and tasks necessary to accomplish such an enormous economic undertaking, without causing socially destructive economic dislocation is the subject of intense current research.

It is a general goal of the present invention to provide computerized market tools usable in countries which may be lacking market infrastructure. It is a more specific goal of the present invention to make available computerized market tools able to support any privatization policy chosen by government policy makers, including making possible the universal distribution policy outlined below.

The struggle of newly democratic nations to replace central planning with increased personal autonomy parallels a comparable struggle in the field of education.[1] While the labels and nuances of the debate have evolved over time,[2] the alternative paradigms are fundamentally analogous: a centralized and depersonalized hierarchy versus a decentralized and personalized heterarchy.[3] The combination of democracy and capitalism can be viewed as a substituted social contract for communism. This is an historically ambitious paradigm shift which is contingent upon a newly democratic society learning new practices which amount to a restructuring of its socio-cultural knowledge.

[1] "Looking at the Soviet experience [of Perestroika] gives us a metaphor to talk about why [a Band-Aid fix] doesn't work. For stable change a deeper restructuring is needed—or else the large parts of the system you didn't change will just bring the little parts you did change back into line. We have to seek out the deeper structures on which the system is based. On this level, too, the Soviet case provides an analogy: for the same categorization—hierarchical-centralized-depersonalized vs. heterarchical-decentralized-personal—applies to the organization of education, to the structure of the curriculum, and to a deeper underlying epistemology. It offers a handle to grasp the conditions for change. Moreover, it suggests a close tie between educational change and the winds of change that seem to be blowing in many other domains in many parts of the globe." Seymour Papert, "Perestroika and Epistemological Politics", MIT Media Laboratory, Epistemology and Learning Group Memo No. 4, p. 12 (1990).

[2] "Progressivism" was championed by John Dewey to advance beyond the rigid regimentation of "traditionalism"; J. Dewey, "Experience and Education" 17–23 (1938). Later, Piaget promoted "constructivism" in which novices are provided settings to build their knowledge in ways meaningful to them, as opposed to "instructionism" in which experts transfer information to novices; see E. Ackermann, "Constructivism and Transference of Meaning Through Form" 12, to appear in L. Steffe (ed.), "Constructivism in Education" (1992).

[3] S. Papert, "Perestroika and Epistemological Politics", MIT Media Laboratory Epistemology and Learning Group Memo No. 4, p. 12 (1990).

Challenges abound. The gap between rigid central planning and capitalism is profound. Central planning took root over decades of social engineering, which amounted to dogmatic instructionism enforced by the apparatus of the state. The danger is that the desired knowledge restructuring will not occur quickly enough to prevent reversion to communism, diversion to fascism, or simply nuclear-tipped instability.

Perhaps it is useful to consider several novel policy approaches to facilitate the transition. The Stock Market Unit basket of enterprise stock is a financial instrument designed to simplify and expedite privatization, which is a key prerequisite to capitalism. The PRIVATIZE!™ (a new system to achieve universal privatization) system is a computerized marketplace tailored for newly democratic nations to support Stock Market Units and other appropriate financial instruments. PRIVATIZATION PLANNER™ (a system to help plan for privatization) is a collaborative knowledge base designed to support customization of the PRIVATIZE!™ (a new system to achieve universal privatization) system, and formulation of privatization policy in general.

These three policy tools are manipulable "objects-to-think-with",[4] intended to facilitate the transition to capitalism. The Stock Market Unit can be available as tangible script in the form of privatization vouchers by means of appropriate regulations. PRIVATIZE!™ (a new system to achieve universal privatization) represents a concrete system in which: 1) a citizen obtains a receipt for tendering a privatization voucher to bid for another asset, 2) after which regional centers aggregate transactions onto diskettes or tape cartridges, 3) to physically transmit to a central computer facility, 4) for execution of transactions and the generation of appropriate records for the citizen or his or her financial institution, 5) from which the citizen can withdraw currency to spend on consumer goods. In other words, it is a system capable of physically transforming a voucher into consumer purchases via a computer marketplace. Likewise, a learner can participate in the creation of an external, shareable knowledge base using PRIVATIZATION PLANNER™ (a system to help plan for privatization) in the spirit of constructionism.[5]

[4] S. Papert, "Mindstorms" 11 (1980).

[5] See E. Ackermann, supra note 2 at 12.

A hierarchy of agents must learn the authentic activities of capitalism.[6] This hierarchy includes: individual citizens such as peasants, enterprise workers, enterprise management and policy makers; organizations such as enterprises or government agencies; communities of policy analysts[7] and entire societies.

[6] Authentic activities are those "coherent, meaningful, and purposeful activities" which amount to "the ordinary practices" of a particular domain. J. Brown, A. Collins, P. Duguid, "Situated Cognition and the Culture of Learning", Educational Researcher 32, 34 (January–February, 1989).

[7] Such communities can coalesce into effective collaborative knowledge building communities without evolving into transnational epistemic communities in which analysts only secondarily identify with their own nation's perspective.

At a sufficiently general level, cognitive development has common themes which cut across these hierarchical levels. The definition of intelligence as "adaptation, or the ability to maintain a balance between stability and change . . . "[8] seems applicable to all levels. Also generally applicable would appear the categorization of knowledge into concrete, logico-mathematical and social-arbitrary.[9] Individual ontological development has even been viewed as a recapitulation of societal phylogenetic development.[10]

[8]E. Ackermann. "From Decontextualized to Situated Knowledge: Revisiting Piaget's Water-Level Experiment", MIT Media Laboratory Epistemology and Learning Group Memo No. 5, p. 4 (1990).

[9]See Devries, Kohlberg, "Programs of Early Education: The Constructivist View" 20–24 (1987).

[10]S. Papert, supra note 4 at 163. But see A. Giddens, "The Constitution of Society" 239 (1984).

However, important distinctions between hierarchical levels should be drawn, even beyond the obvious differences in time scales and scope of knowledge. In particular, an overall system need not behave like its individual components.[11] For example, individuals have a powerful affective component of learning.[12] Organizations can be "jump-started" with social-arbitrary knowledge such as laws and commercial practices much more quickly than individuals mature. A case can also be made that even though a society more or less effectively incorporates all the concrete and logico-mathematical knowledge of its component organizations and individuals, its social-arbitrary knowledge plays a still greater role.

[11]M. Resnick, "Overcoming the Centralized Mindset: Towards an Understanding of Emergent Phenomena", MIT Media Laboratory Epistemology and Learning Group Memo No. 11, p. 1 (1990).

[12]S. Papert, supra note 4 at vii–viii.

Knowledge restructuring involves the change of a conceptual system along a fundamental dimension such as the domain of accounted-for phenomena, the nature of acceptable explanations, and even core concepts.[13] This is a useful framework to explore the social transformation of a society from communism to capitalism and democracy. If the learning entity is taken to be the society itself, the classic applications of knowledge restructuring such as paradigm shifts and education in a sense converge. In analyzing the degree of change along the different dimensions, the domains of application seem similar: the economy and politics. However, acceptable explanations change dramatically. For example, government-as-central-planner is jettisoned, and private property becomes a legitimate and recognized stimulus for individual initiative and macroeconomic growth. Fundamental changes also occur in core concepts, such as the new notion of profit as a desirable objective.

[13]S. Carey, "Cognitive Science and Science Education", 41 (No. 10) American Psychologist 1123, 1126 (October 1986).

Knowledge restructuring at the societal level in the domains of capitalism and democracy can be associated with a novice-expert shift by a newly democratic nation. According to the Soviet educational psychologist Lev Vygotsky, such learning requires comprehensible interaction with an expert (such as a stable and successful democracy), but within the novice's zone of proximal development.[14] The serious concerns about the feasibility of a successful transition to capitalism and democracy effectively question whether those objectives are within the zone of proximal development of all formerly communist nations.

[14]The zone of proximal development is the zone within the novice's potential to achieve, given interaction with a suitable expert. R. DeVillar, C. Faltis, "Computers and Cultural Diversity" 10–12 (1990).

This concept of a novice-expert shift should be broadened to include a multidimensional continuum of expertise. The societies of the world each have missing or maladaptive knowledge or behavior in different areas, so that even the "experts" are capable of learning through interaction. In addition, there are multiple role models for newly democratic nations. For example, capitalism in the U.S. has a distinctly different character than in Germany. Thus, newly democratic nations are in a position to exercise their right (arising from sovereignty and self-determination) to direct their own learning process by selecting policies consistent with their heritage (where they've been) and their objectives (where they want to go).

The role of "expert" societies in facilitating knowledge restructuring for newly democratic nations can be viewed from several perspectives. Even the example of experts makes available a directed goal and encouragement about what is possible. More actively, the experts can foster a process of enculturation in which newly democratic nations learn the ordinary practices of capitalism and democracy through authentic activities which are coherent, meaningful and purposeful.[15] This is achieved by social interaction amounting to cognitive apprenticeship, rather than instructionism transmission of decontextualized information chunks.[16] For example, according IMF observer status to Russia creates a valuable learning opportunity through legitimate peripheral participation.[17]

[15]See J. Brown, A. Collins, P. Duguid, "Situated Cognition and the Culture of Learning", Educational Research 32, 33–34 (January–February 1989).

[16]Id. at 37.

[17]See id. at 40.

These concepts can also be applied at the organizational or individual levels of the hierarchy. The International Bank for Reconstruction and Development is a multinational organization capable of making expertise and resources available to the privatization boards in newly democratic nations, which are major generators of the privatization policies and regulations amounting to updated social-arbitrary knowledge. Enterprises in newly democratic nations learn through expert consultants advising on authentic activities such as international trade or financial reporting. Of course, societal or organizational learning must also reflect individual learning, such as achieved by business or academic exchange programs.

Besides encouraging meaningful interaction, the west can accelerate the transition to democracy and capitalism with appropriate "objects-to-think-with." These can help a newly democratic nation across the zone of proximal development either by reducing the effective "distance" or by increasing the effective "speed." For example, a financial instrument such as Stock Market Units and concrete support by a computerized marketplace like PRIVATIZE!™ (a new system to achieve universal privatization) provide basic goals within closer reach than comprehensively sophisticated real-time marketplaces in the west. And even such basic goals can be achieved more quickly by an effective knowledge building community, as supported by a collaborative knowledge base such as PRIVATIZATION PLANNER™ (a system to help plan for privatization).

A collaborative knowledge base is the product of a knowledge building community which constructs patterns of knowledge through sociocultural activity, while renewing itself through ongoing apprenticeship.[18] Education has typically involved the assignment of tasks or the orchestration of a novice's development.[19] In contrast, a knowledge building community helps novices "formulate their own goals, do their own activating of prior knowledge, ask their own questions, direct their own inquiry, and do their own monitoring of comprehension."[20] In the context of national self-determination, this is naturally the appropriate way to support efforts at privatization. As in science, collaboration is mutually beneficial as the knowledge base grows cumulatively, if not exponentially. Therefore, it is highly desirable for privatization policy analysts in newly democratic nations and established democracies to coalesce into an effective knowledge building community.

[18]See M. Scardamalia, C. Bereiter, "An Architecture for Collaborative Knowledge Building" 2, in E. De Corte, M. Linn, H. Mandl, L. Verschaffel (eds.), "Computer-Based Learning Environments and Problem Solving", NATO-ASI Series F.: Computer and Systems Sciences (in press).

[19]M. Scardamalia, C. Bereiter, "Higher Levels of Agency for Children in Knowledge Building: A Challenge for the Design of New Knowledge Media", 1 (No. 1) Journal of Learning Sciences 37, 38–39 (1991).

[20]Id. at 39.

A knowledge building community of privatization policy analysts can be promoted by PRIVATIZATION PLANNER™ (a system to help plan for privatization), a collaborative knowledge base generator able to support the systematic formulation of privatization policy. It is initialized with a hierarchy of topics containing pages of information. This knowledge base is distributed by the system coordinator to privatization policy analysts by diskette, for them to evaluate and comment on its organization and content or propose changes.

For example, the first menu of topics includes "Methods of Share Distribution", "Current Status in Selected Newly Democratic Nations", and "Privatize!(tm)." The analyst could choose the third topic, select the "Customization" subtopic, and then explore whether PRIVATIZE!™ (a new system to achieve universal privatization) should be customized to support shareholder enterprise votes.

At this point the analyst has a variety of options before moving on to another topic. He or she can respond to questions embedded in the information pages (in this case, whether the feature should be included and why or why not). The analyst can also evaluate and comment on the presentation of the topic, and thereby influence whether or not it will be retained into the next generation. Another option is to insert proposed new pages of information or even additional related subtopics. The proposed additions can also contain embedded questions, and will also be subject to evaluation and comments.

The system coordinator compiles all responses and makes comments available to the relevant authors for review. After either manually or algorithmically determining the "best" versions and alternates of the knowledge base from the evaluations provided by the analysts, the next generation is distributed and undergoes another cycle of review.

Design choices reflect the objective to achieve a clean, simple and cost-effective system. While there is a login sequence to identify responders, security is provided by transmission of diskettes to and from known groups ineligible to sign with other users' ids. While proposed topics and pages of information are available to all users for review, comments are only made available to the relevant authors. This preserves the independence of future comments and simplifies processing, but at the expense of intellectual interaction. The algorithms to "score" the topics and pages of information are straightforward functions of quality and quantity, subject to parameter-tuning or even manual override in practice. Finally, pop-up windows for simultaneous topics, help screens or glossaries may be desirable.

There are broad parallels between progressive developments on the world stage and in the educational arena. The common theme is greater individual autonomy and less hierarchical control. The transition to democracy and capitalism can be seen as a restructuring of societal knowledge, amounting to a novice-expert shift requiring basic enculturation by authentic activities.

This process can be facilitated by appropriate "objects-to-think-with", including Stock Niarket Units, the PRIVATIZE!™ (a new system to achieve universal privatization) computerized marketplace and the PRIVATIZATION PLANNER™ (a system to help plan for privatization) collaborative knowledge base. Stock Market Units provide an expedient and fair way to transfer ownership in a basket of large state enterprises. PRIVATIZE!™ (a new system to achieve universal privatization) transforms vouchers into increased personal consumption through a physical chain which includes a computerized marketplace. PRIVATIZATION PLANNER™ (a system to help plan for privatization) supports constructivism as an external, shareable collaborative knowledge base. Perhaps the greatest value of straightforward and legitimate policies is their potential to accelerate change in a world where patient tolerance of learners progressing at a natural pace may be inconsistent with the avowed objectives of capitalism and democracy.

SUMMARY OF THE INVENTION

The present invention includes a computerized method of operating a market system, comprising the steps of: providing a computerized knowledge base incorporated in a computer system by which the knowledge base may be modified responsive to user evaluations and user contributions; formulating market system policies and parameters in accordance with contents of the knowledge base after any modifications made by the computer system to the computerized knowledge base; and on a digital computer, executing instructions to consummate market transactions by performing cross-price resolution, according to the policies formulated after any modifications to the computerized knowledge base.

In a variation on the invention, the present invention may further include steps of receiving transaction orders, including portfolio trading delegation orders; and executing trading delegation orders for which cross-price resolution converges, resulting in delegator/delegatee assignments by which a delegator's portfolio is managed by a delegatee.

In a further variation, the invention may include collecting and entering transaction orders into a computer system at a first level of a receiving hierarchy; combining the collected and entered transaction orders into a transaction file, by executing instructions on the computer system; writing the transaction file to a least one physical medium; and sending the physical medium to a second level of the receiving hierarchy.

Another variation on the invention may include steps of collecting and entering transaction orders into a computer system at a first level of a receiving hierarchy; combining the collected and entered transaction orders into a transaction file; and transmitting the transaction file to a second level of a receiving hierarchy over an electronic communication network.

In yet another variation, the invention may include a step of receiving orders transmitted electronically by individual users.

The above variations may be combined to form additional variations on the present invention. Additional aspects of the present invention will become apparent to those skilled in the art, on reading the following description.

BRIEF DESCRIPTION OF THE DRAWINGS

Like reference numerals indicate like elements in the Figures, in which.

DETAILED DESCRIPTION—SECTION I

The present invention will be better understood in view of the following description, read in connection with the figures. The following description relates primarily to an embodiment of the invention suitable for privatizing a large economy. However, this is merely an example, given for purposes of illustrating the principles of the invention, which may be practiced in a variety of other contexts, some of which are indicated at appropriate points in the discussion. Some details in the following discussion may be implemented differently, yet remain within the contemplation of the present invention.

Figure 1:
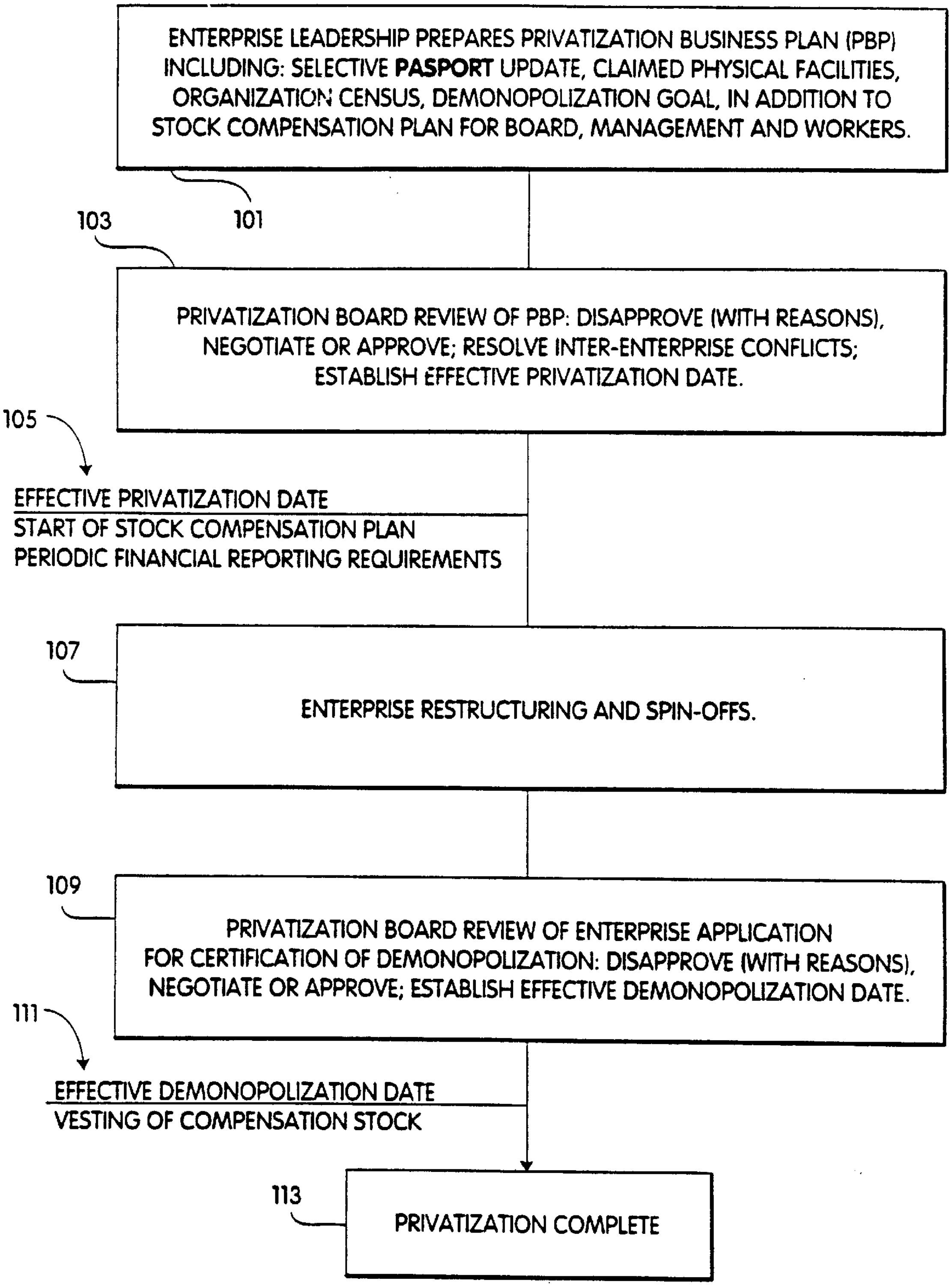
FIG. 1 is an overview flow chart of the privatization process contemplated by the present invention.

A basic process of privatization in accordance with the present invention is illustrated in FIG. 1. Various steps in this process are supported by computerized tools, such as will be described below. In order to understand the interrelationships between the computerized tools, it is first necessary to understand the privatization process contemplated by the present invention, though the invention is applicable to other processes, as well.

Each enterprise to be privatized is to undergo a process substantially as shown in FIG. 1. The enterprise leadership first prepares a privatization business plan (FIG. 1, Step 101). The plan should include such detailed information as the current productive capacity of the enterprise, the capital stock and labor force of the enterprise, a list of claimed physical facilities, a demonopolization goal as explained below, a stock compensation plan for board, management and workers of the enterprise, and such other elements as would conventionally be included in a business plan. Subsequently, the privatization business plan is reviewed by a Privatization Board (FIG. 1, step 103).

The Privatization Board has several options by which it may dispose of a privatization business plan. It may disapprove of the privatization business plan, along with reasons for that disapproval. The Privatization Board may approve of a privatization business plan, in whole or in part. The Privatization Board may negotiate with the enterprise regarding a privatization business plan which has been disapproved in whole or in part. Thus, the interaction between the enterprise leadership and the Privatization Board helps to ensure that viable privatization business plans are written and subsequently executed.

Often, the Privatization Board will find that a privatization business plan for one enterprise conflicts with a privatization business plan, current or published contemplated future operation of another enterprise. In such a case, the Privatization Board will resolve such inter-enterprise conflicts at the time of the review of the privatization business plan.

Finally, in the course of the Privatization Board Review, an effective privatization date 105 is established. Naturally, an effective privatization date is established only for privatization business plans which have been approved.

On the effective privatization date 105, the enterprise begins to execute its privatization business plan. The stock compensation plans described in the privatization business plan are implemented. Periodic financial reporting requirements are enforced.

In accordance with the plans laid out in the privatization business plan, the enterprise begins restructuring (FIG. 1, step 107). The enterprise may also initiate new, private, spin-off enterprises.

When the enterprise leadership has reason to believe that the goal for demonopolization set in the privatization business plan (FIG. 1, step 101) has been met, then the enterprise may submit an application for certification of demonopolization to the Privatization Board (FIG. 1, step 109). The Privatization Board again has the options of approving, disapproving, or negotiating changes to the application. When an application for certification of demonopolization has been approved, then the Privatization Board will establish an effective demonopolization date 111.

On the effective demonopolization date, the compensation stock from the stock compensation plans initiated on the effective privatization date will vest. At this point, privatization may be considered complete (FIG. 1, step 113).

Figure 2:
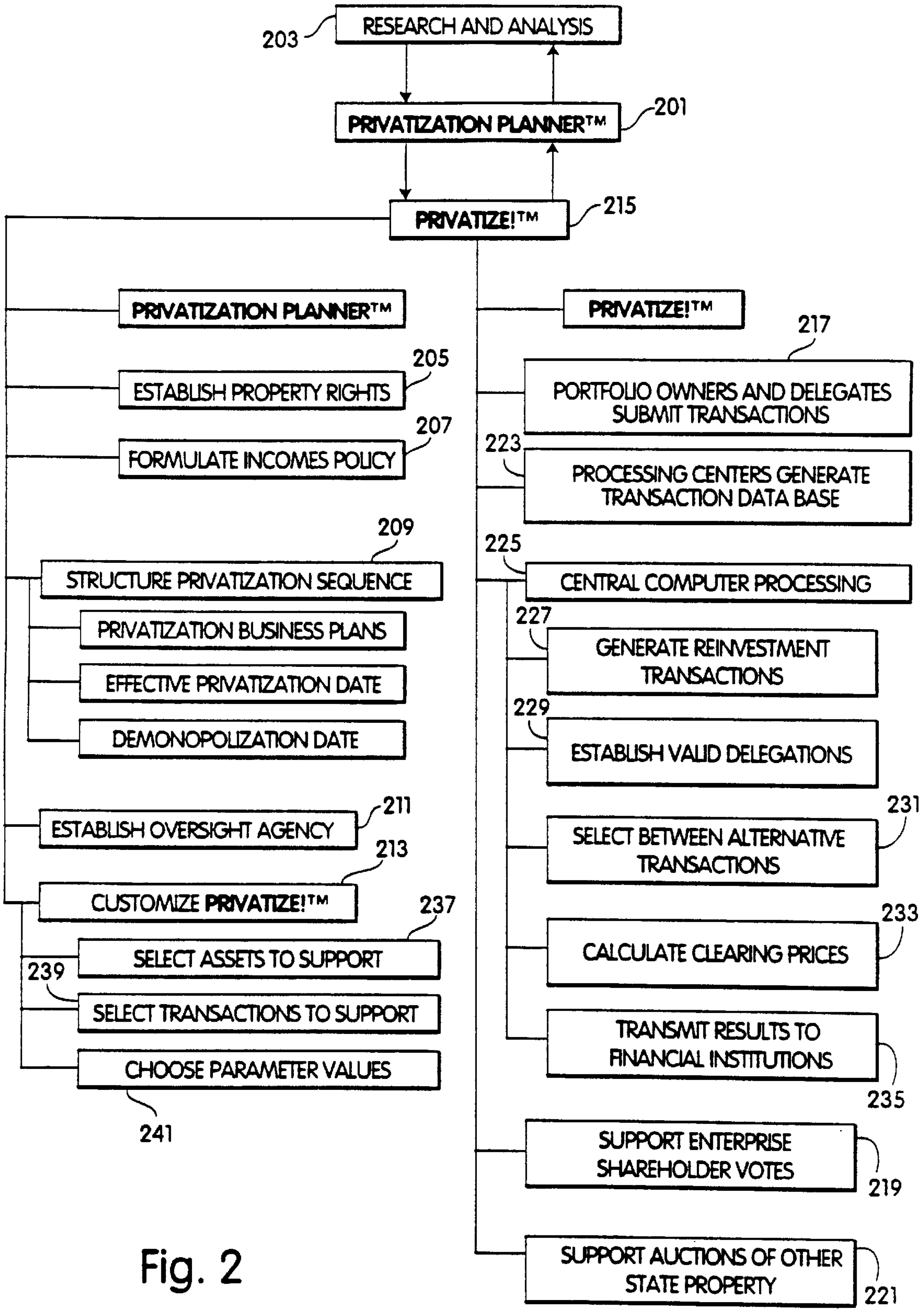
FIG. 2 is an organizational block diagram of the inventive privatization process and the tools for implementing the same.

The organization block diagram of FIG. 2 indicates how the tasks of privatization are divided among the computerized tools which are to be used to implement privatization. The tasks are divided into substantially two groups: planning tasks and transactional tasks.

Planning tasks include the establishment of policy, the formulation of plans, the setting of goals and dates, and the customization of the tools for supporting the transactional tasks. Supporting this aspect of privatization is the PRIVATIZATION PLANNER™ (a system to help plan for privatization) computerized tool 102. Research and analysis 203 is performed using this computerized tool, which adapts to changing conditions, as described below. This tool will enable a country's economic leadership to plan privatization policies including the establishment of property rights 205, the formulation of incomes policies 207, structuring the privatization sequence 209, establishing an oversight agency 211 and communications with and within that agency, and customization 213 of the PRIVATIZE!™ (a new system to achieve universal privatization) computerized tool 215 for management of transaction tasks.

The PRIVATIZE!™ (a new system to achieve universal privatization) computerized tool 215 permits the economic leadership of a country to process transactions submitted by portfolio owners and delegatees of portfolio owners concerning the enterprises owned 217, support enterprise polled shareholder voting 219 and support auctions of other state property 221. File definitions, asset types, transactions and commands are described below. In performing these tasks, processing centers will generate transaction data bases 223, which are ultimately merged into a single transaction data base for processing. A central computer which processes the transaction data base 225 generates reinvestment transactions 227, establishes valid delegations 229, selects between alternative transactions 231, calculates clearing prices 233 and transmits results to financial institutions 235. The assets permitted to be owned and transactions permitted to be performed 239, by portfolio owners and delegatees are determined during a customization process 213 performed by the economic leadership of the country using PRIVATIZATION PLANNER™ (a system to help plan for privatization). The customization process 213 is also used to establish parameter values 241, such as the period over which the transactions will be processed, called the investment cycle period.

The described embodiments of the invention are contemplated as being implemented in a version of the C programming language. This choice yields a number of advantages.

The C programming language is a subject of international standards. Therefore, it is suitable for use in various countries. Furthermore, it is extremely portable from one computer platform to another computer platform, without extensive re-coding of modules, except perhaps certain platform-dependent interface modules. Yet another advantage of using the C programming language is that compilers are currently available on most platforms which produce particularly efficient, fast code. This last advantage makes the invention suitable for implementation using PC hardware, when so desired.

Figure 4:
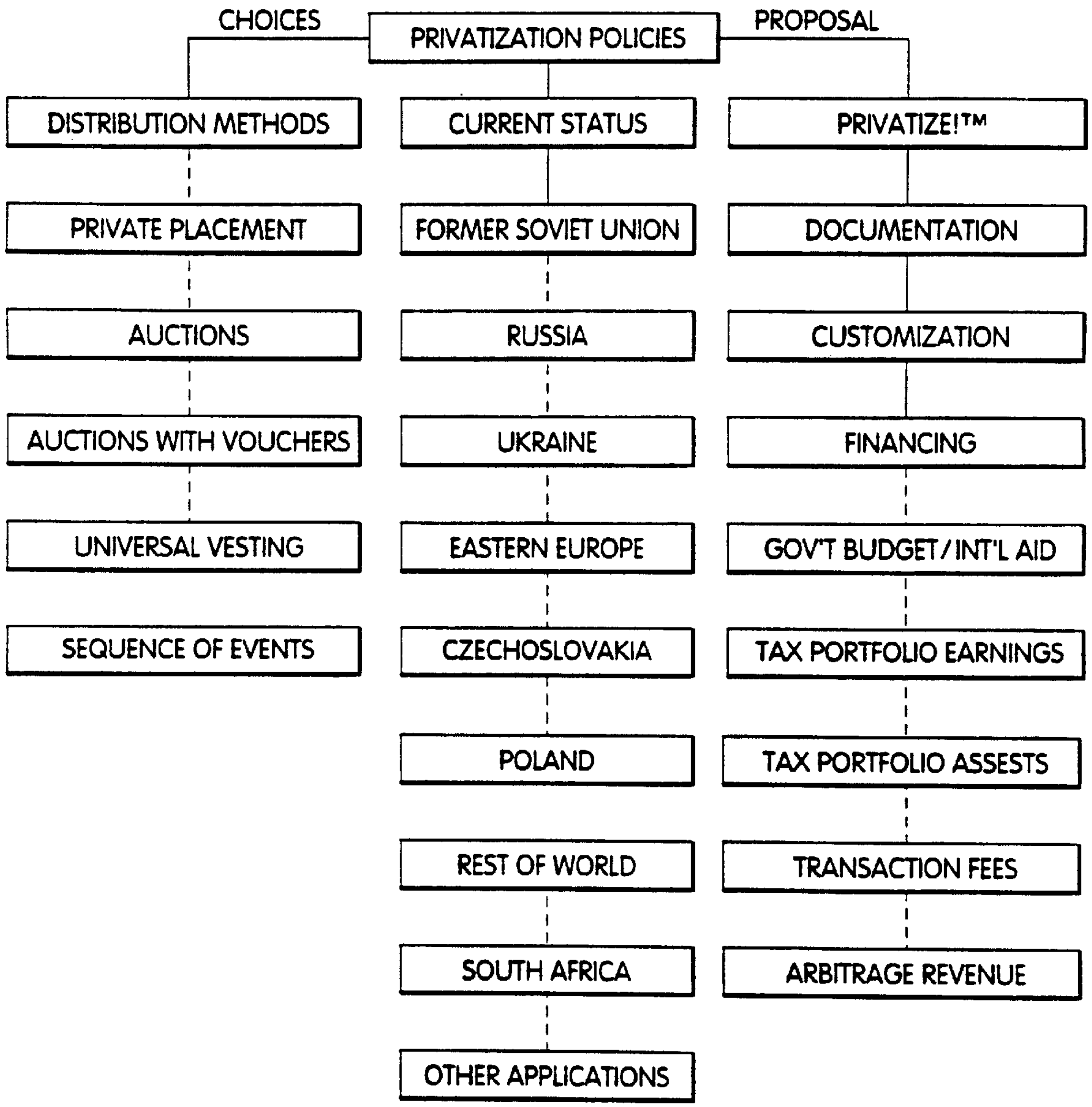
FIG. 4 is a concept map of the hierarchical structure of an initial knowledge data base for the privatization planner of the present invention.

The PRIVATIZATION PLANNER™ (a system to help plan for privatization) computerized tool is next described. The PRIVATIZATION PLANNER™ (a system to help plan for privatization) is a computerized collaborative knowledge base tool designed to support custom privatization of a country's enterprises. Of course, depending on the contents and organization of the initial knowledge base with which PRIVATIZATION PLANNER™ (a system to help plan for privatization) has bee initiated, it could be used in any application where it is desired to form a knowledge base which grows and evolves based upon user evaluations and proposed contributions. One such initial knowledge base is illustrated in the concept map of FIG. 4. Examples of such suitable applications of adaptive knowledge bases include: the pursuit of sustainable development; research into avoiding ethnic strife; movie rating systems used in video rental and sales stores; and a literary anthology for which authors are remunerated based on the popularity of their contributions. For example, the embodiment of the adaptive knowledge base invention in a tool to support the pursuit of sustainable development, designated as the "Sustainable Development Server" (a system to advance sustainable development), is achieved by adapting the identifying contents of the welcome screen, relabeling the name of the tool and subsequent screen displays, and using the same general purpose commands to create a structure of topics and associated pages of information relating to sustainable development. It is specifically contemplated that users may or may not be charged fees based upon the amount and nature of their knowledge base access. Contributors may or may not be remunerated based on the quantity, ratings and longevity in the knowledge base of their contributions.

The PRIVATIZATION PLANNER™ (a system to help plan for privatization) tool is implemented as a software program running on either one or more individual portable or personal computers in the hands of individual users or user groups, or accessible on electronic networks, including a worldwide network such as Internet. Individual users possess copies of relevant portions of the knowledge base for use with their copy of the tool. The knowledge base of the PRIVATIZATION PLANNER™ (a system to help plan for privatization) tool is modified and updated based on evaluations entered by users of the tool. See FIG. 3.

Figure 3:
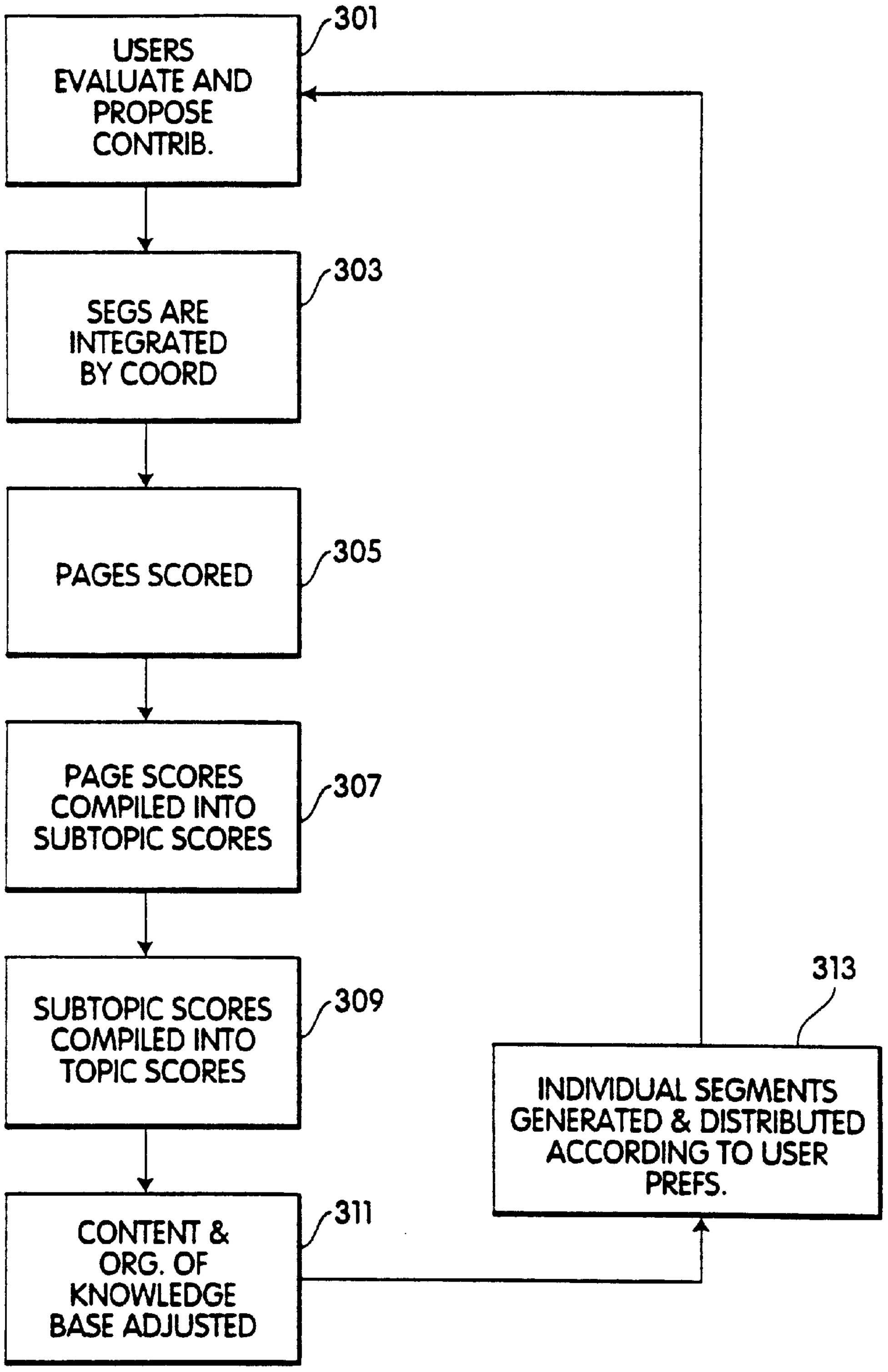
FIG. 3 is a flow chart of updating a policy knowledge base according to one aspect of the present invention.

The user evaluation cycle illustrated in FIG. 3 begins with users evaluating and proposing contributions (step 301) to the topics, subtopics, pages and organization of the knowledge base segment in their possession. The segments are then integrated (step 303) by a knowledge base coordinator operating a copy of the PRIVATIZATION PLANNER™ (a system to help plan for privatization) tool to form a complete knowledge base containing the integrated whole of the knowledge base segments previously possessed by the individual users. Next, the pages are scored by the PRIVATIZATION PLANNER™ (a system to help plan for privatization) tool (step 305). Page scores are compiled into subtopic scores (step 307) and subtopic scores are compiled into topic scores (step 309). Making decisions in accordance with the scores obtained in the previous steps, the PRIVATIZATION PLANNER™ (a system to help plan for privatization) tool adjusts the content and organization of the knowledge base (step 311). The adjustments are based upon some form of optimization of the scores obtained above. Finally, individual segments are generated and distributed in accordance with the user preferences (step 313).

Users may customize their usage of the tool, and can effectively access even very large numbers of entries using sophisticated keyword techniques and by filtering and sorting entries using date, evaluations by other users, and evaluations of the user himself using either actual evaluations or estimates based on past correlations or anti-correlations with other users. PRIVATIZATION PLANNER™ (a system to help plan for privatization) also provides an interface to a simulation of the PRIVATIZE!™ (a new system to achieve universal privatization) computerized marketplace, allowing users to simulate portfolio transactions and asset prices using the methods contained in the PRIVATIZE!™ (a new system to achieve universal privatization) tool.

The PRIVATIZATION PLANNER™ (a system to help plan for privatization) computerized tool permits distribution of segmented or partial knowledge data bases, based on individual preferences. The knowledge base may be distributed in whole or in part over a network or on such physical distribution media as diskettes and CD-ROM.

After each user of the knowledge base has entered comments and evaluations to their own satisfaction, the segment of which they are in possession is returned, through the network or physical media distribution channel, to a knowledge base coordinator. The knowledge base coordinator merges the knowledge bases of all users into a single large knowledge base on a regular basis. The results of the various users' evaluations of entries in the knowledge base are then used by the PRIVATIZATION PLANNER™ (a system to help plan for privatization) adaptive mechanism to eliminate entries which are of insufficient interest or value to users.

Although the adaptive function has been thus far described in connection with entries, or information content, the structure of the knowledge base is also subject to user evaluation. A knowledge base is organized into topics, which have both content and organization. Furthermore, evaluations are graded on both quantity and quality. That is, an entry or topic organization evaluation consists of both the amount of information associated with that topic and the value of the evaluation given by each user.

Figure 7:
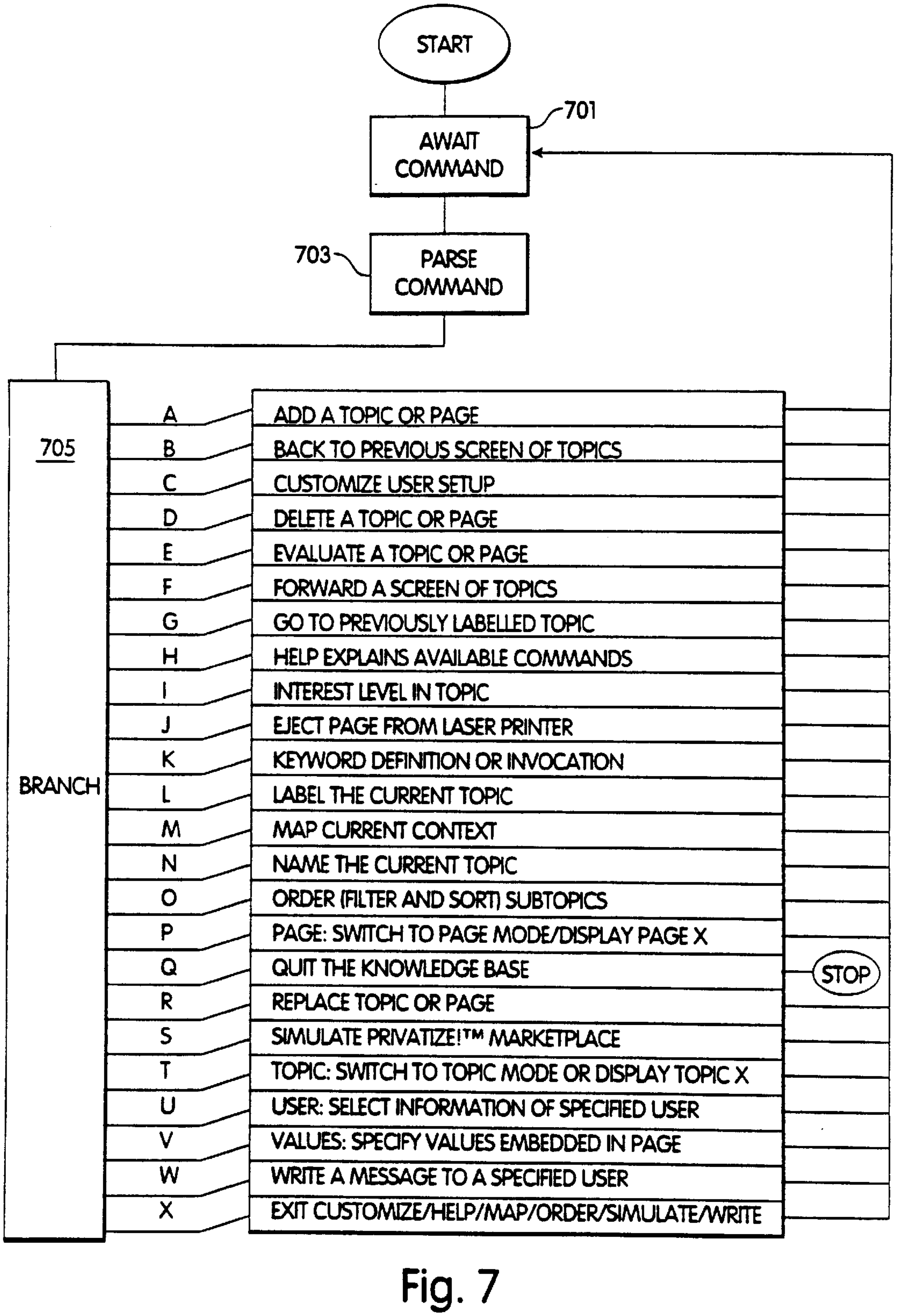
FIG. 7 is a flow diagram of the logic of the privatization planner embodiment of the adaptive knowledge base tool of the present invention.

A more detailed discussion of the logic of the method embodied in the PRIVATIZATION PLANNER™ (a system to help plan for privatization) aspect of the invention is now given in connection with FIG. 7. The PRIVATIZATION PLANNER™ (a system to help plan for privatization) tool is an event-driven tool, which executes a loop as now described.

The tool first enters a state of awaiting a user's command (step 701). When a command has been entered, and confirmed if so required by a particular embodiment, then the tool parses the command entered (step 703) to determine which of several alternative actions to next branch to (step 705). In the C programming language, this action is commonly embodied in a CASE statement. Next, the action required by the parsed command is performed (step 707), after which control returns to the step of awaiting a user's command. Each of the commands implemented is invoked by a user by entering the reference designator of the branch from the step of branching (step 705) to the desired command action (step 707).

PRIVATIZE!™ (a new system to achieve universal privatization) is a computerized tool to support free markets in newly democratic nations. The tool is capable of implementing any privatization policy chosen by government policy makers, and in particular includes a capability to support distribution of shares in large state enterprises to an entire citizenry. Universal distribution of at least a portion of public assets, such as large state enterprises, can completely avoid the need to value that portion of assets prior to privatization. This is advantageous in developing economies without any adequate means of achieving such valuations. It is also advantageous in and applicable to developed economies because it can avoid the large absolute inefficiency associated with even a modest relative underwriting valuation error. Legislation or a decree can vest in each citizen privatization rights in the form of Stock Market Units (SMUs). SMUs are a way to aggregate rights to equity in state enterprises into a current private asset, by defining a new financial instrument composed of one citizen's share in each enterprise due to be privatized over a fixed interval. While normally the fixed interval will begin on or immediately after the date of legislation and terminate at some future date certain, it is also possible to define intervals which are completely in the past or which are completely in the more distant future. For example, if the main SMU were defined to extend from the date of legislation to the end of the subsequent year, then a SMU2 could be defined to begin at the termination of the fixed interval of the SMU and continue for an additional year or more. SMUs can be immediately and freely traded. In particular, a citizen's right to a SMU allocation can be used in bidding for small state enterprises at once, even before implementation of the entire system. The PRIVATIZE!™ (a new system to achieve universal privatization) tool solves the problem in newly democratic nations that a stock trading infrastructure must quickly be provided to execute market transactions in the absence of a significantly developed communication and financial intermediation infrastructure. Thus, it is a particular feature of PRIVATIZE!™ (a new system to achieve universal privatization) that the files and methods used may be efficiently implemented using minimum hardware and in the absence of an advanced infrastructure. For example, communications are contemplated as performed using physical transfers of information on diskettes, tapes or other physical media when sophisticated telecommunications happen to be lacking. Similarly, the market resolution methods are suitable for implementation on personal computers (PCs) as well as large mainframes.

Other assets contemplated as being traded in accordance with the PRIVATIZE!™ (a new system to achieve universal privatization) embodiment of this aspect of the invention include stock or debt in specific enterprises, debt of governments or financial institutions, foreign currency, price level adjusted mortgages, in addition to flexibly specified annuities which are keyed to standardized actuarial tables and priced according to their implicit interest rate. This aspect of the present invention has many other useful applications. For example, assets such as natural resource rights in Bahrain, air pollution rights in the United States, or the proceeds of a South African wealth tax collected either in the form of money or "in kind" such as in the form of stock, could be vested in a very large number of recipients or an entire citizenry, and a marketplace with an extremely broad investment opportunity set provided by this system. Appropriate bids and offers for any available asset can be made by any entity with an account on the system, including governments, organizations and individuals. One objective of this aspect of the invention is to provide a "springboard" to free enterprise in the context of a free market.

The tool also supports the creation of a "social security" account for each citizen, for example initially endowed with a supplemental allocation of Stock Market Units or newly privatized stock in individual enterprises by means of universal distribution. This can be a very attractive capability even in developed market economies where large state enterprises are to be privatized but policy makers wish to strengthen the social safety net in the process. The regulation of such social security accounts can specify that the Stock Market Units in these accounts can only be exchanged for government debt, lifetime annuities or other specified assets, but with immediate distributions when necessitated by hardship. Such regulation of social security accounts is supported in the PRIVATIZE!™ (a new system to achieve universal privatization) tool. See, for example the Security transaction below. Additional allocation of Stock Market Units can be made to social welfare accounts of local governments in an amount corresponding to the number of citizens liable to be missed, for example due to homelessness. The result is a strengthening of the "safety net" for social welfare.

PRIVATIZE!™ (a new system to achieve universal privatization) supports the market for enterprise shares in a variety of ways such as dividend payments, stock subscriptions and "going private." It also provides subsets of shareholder lists for shareholder votes based on polling techniques. An embedded marketplace for the delegation of authority to professional investment organizations at competitive rates is included in the PRIVATIZE!™ (a new system to achieve universal privatization) tool to facilitate efficient markets and price discovery. These features of the market tool are additional examples of capabilities which can be valuable in developing and developed economies alike. It is specifically contemplated that users of the PRIVATIZE!™ (a new system to achieve universal privatization) tool may or may not be charged fees based on the amount and nature of their usage of the system.

The operation of the PRIVATIZE!™ (a new system to achieve universal privatization) tool is now described in connection with FIGS. 5 and 6.

The investment cycle begins with the input of transaction data into a hierarchical system of computers. This phase is complete upon the production of a comprehensive and sorted Transaction Data Base (XDB). This is composed of blocks containing all transaction data for a given entity, and sorted by ID code. This data base is then processed by means of five passes, in order to implement delegations as appropriate, establish asset prices, execute transactions as appropriate, and transmit the results to custodial financial institutions.

PRIVATIZE!™ (a new system to achieve universal privatization) is a general system capable of supporting a broad range of policy choices. It works in tandem with PRIVATIZATION PLANNER™ (a system to help plan for privatization), which provides a collaborative knowledge base in support of policy formulation. Policy choices such as the allocation of Stock Market Units to the citizenry will often be implemented by appropriate governmental transaction input to the PRIVATIZE!™ (a new system to achieve universal privatization) tool. Regulation such as the maximum number of transactions an individual or organization is allowed to submit, and technical specification such as the choice of field delimiters, are used to adapt modules such as GLOPARM as appropriate.

Figure 5:
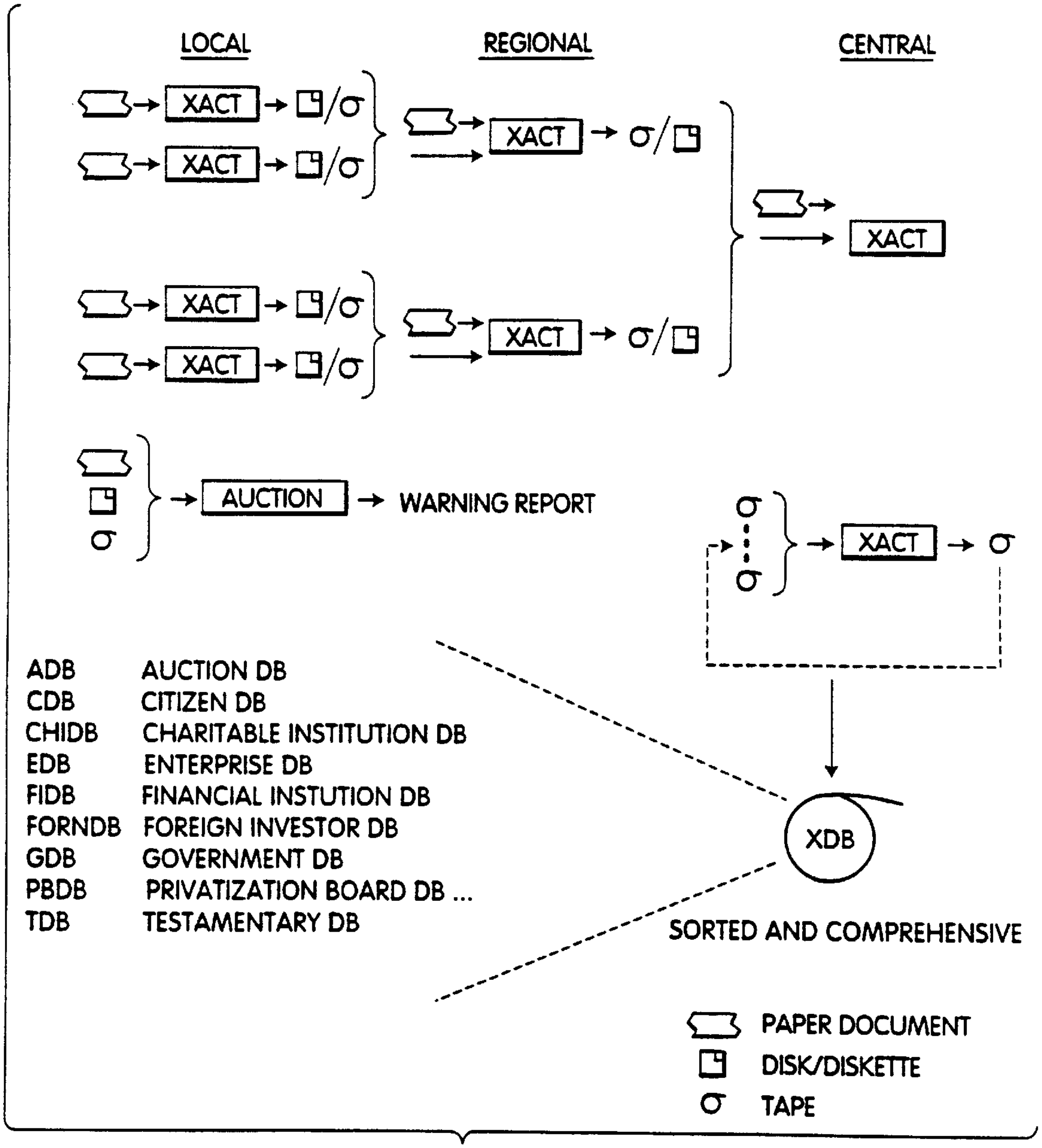
FIG. 5 is a flow diagram illustrating the formation of a transaction data base for use by the privatization implementation tool of the illustrated embodiment of the present invention.

The Transaction Data Base (XDB) is prepared as illustrated in FIG. 5 using module Transact (XACT). Module XACT requests the input devices, which can include the terminal and auxiliary storage such as floppy disk or tape drives. The operator also specified the output device and the size of any random access disk file available for sorting.

As XACT reads transaction blocks from one or more input devices, it performs initial validity checks. If an error is found in the input from the terminal, the operator can immediately correct the transaction block, in addition to making any appropriate notation on the input forms. If an error is found in input from another device, the operator can enter additional transactions to cancel out the error and introduce a corrected substitute transaction.

Module XACT performs merge-sorting into main memory on the transaction blocks read in. XACT notifies the operator when it stores a sorted memory buffer onto disk, and when it merge-sorts any disk files to the output device. If a disk is unavailable, the sorted memory buffer is stored directly onto the output device. XACT provides the operator an opportunity to change the diskette or tape after each output cycle. This allows the output to be subsequently merge-sorted if multiple input devices are available.

The resulting diskettes or tapes are transmitted to the next higher node in the hierarchical network of processing centers either physically or electronically. For example, the network illustrated in FIG. 5 includes local, regional and central nodes. At the central computer facility, the operators generate a single comprehensive sorted XDB by iteratively merge-sorting the input. XDB should then be backed up and archived off-site. Throughout the process, the operators preserve the physical break-points in the series of tapes which correspond to the logical subdivision into categories of portfolio owners such as governments, enterprises and citizens.

Figure 6:
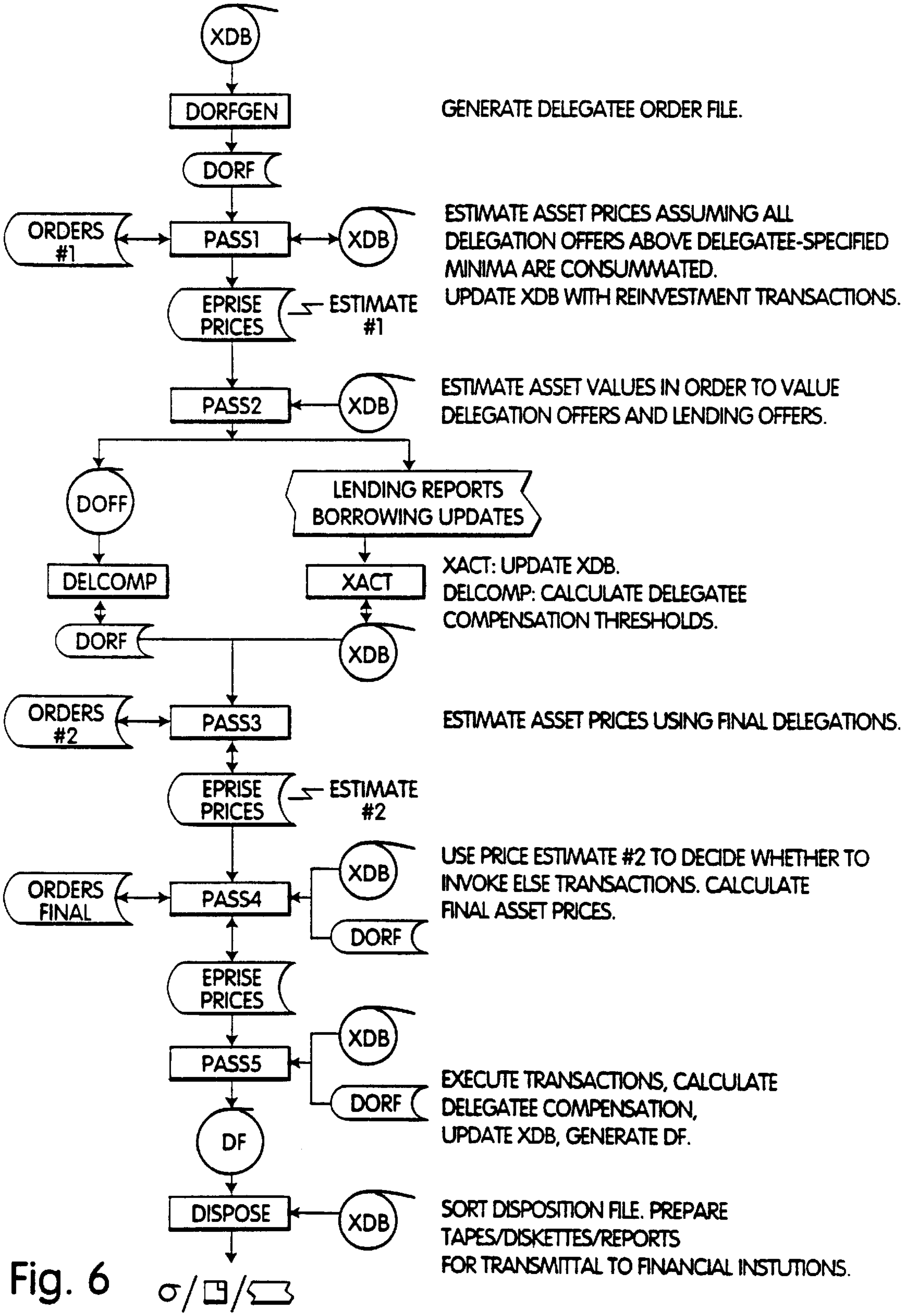
FIG. 6 is a flow diagram of a process for updating a transaction data base using the privatization implementation tool of the illustrated embodiment of the present invention.

As shown in FIG. 6, processing the Transaction Data Base (XDB) involves running a series of modules at the central computer facility. Detailed definitions of the files processed and the functions of the modules are presented below. Module Delegatee Order File Generator (DORFGEN) is run on the delegatee-organization subset of the XDB to create the random access disk file Delegatee Order File (DORF). Upon creation, file DORF should be backed up, to archive and to recover from processing disruptions. Likewise, module Enterprise File Generator (EGEN) is run with interactive input to create and maintain the random access disk file Enterprise File (EPRISE), which should also be backed up.

The operator then runs module PASS1. PASS1 first requests the tapes for the enterprise segment of XDB to update dividend information in EPRISE, which should then be backed up. PASS1 then requests the entire XDB tape series, generating the serial file ORDERS #1 and an update version of XDB containing reinvestment transactions. It then requests the tapes comprising ORDERS #1 so that module PRICING can calculate price estimate #1 and post it to random access files EPRISE and PRICES. The operator should back up EPRISE and PRICES, and then archive them, ORDERS #1 and the original XDB.

The operator next runs module PASS2, which requests tapes comprising the updated XDB, and generates the serial file Delegation Offer File (DOFF) and a lending report. The lending report may be distributed to selected potential large borrowers, who are given a brief opportunity to update their borrowing transactions. Any new borrowing transactions are input to module XACT, along with an appropriate subset of XDB including, for example, only the government segment and perhaps financial institutions or even other enterprises. Module XACT generates a new XDB subset, and the operator archives the subset being replaced. The operator then runs module Delegatee Compensation (DELCOMP) which requests the tapes comprising DOFF, and generates the random access Delegatee Order File (DORF).

Module PASS3 is run next. It requests the XDB tapes and generates the serial file ORDERS #2. PASS3 then requests the tapes comprising ORDERS #2 so that module PRICING can calculate price estimate #2 and post it to random access files EPRISE and PRICES. These files should then be backed up and archived.

The operator next runs module PASS4, which again requests the XDB tapes, and generates the final serial ORDERS file. It then requests the final ORDERS and posts the subsequently calculated final prices to file EPRISE and PRICES, to be backed up and archived.

In the final complete pass, the operator runs module PASS5 which requests the XDB tapes, generates a final updated XDB file, and also generates serial file Disposition File (DF). The intermediate set of XDB tapes should then be archived.

Module DISPOSE is then run, which requests the DF tapes and the financial institution segment of XDB. Module DISPOSE then generates a combination of reports and tapes or diskettes for transmittal to custodial financial institutions. A copy of these transmitted files and the input DF tapes should then be archived.

The above sequence of processing steps is described from the perspective of an operator of the computerized market tool Following is a description of the internal logical steps accomplished by that tool. Initially, a sorted and comprehensive Transaction Data Base (XDB) is assumed to be available. After first updating the Enterprise File (EPRISE) with dividend information, module PASS1 executes the first complete pass through XDB assuming all offers to delegate in excess of the delegatee-specified minimums are consummated. At this point, the serial XDB file may be very large. PASS1 reads the serial XDB and the random access Delegate Order File (DORF), which is typically much smaller than XDB, by calling XBLOCK, which in turn invokes modules ORDERS and PRICE, to generate an initial approximation of asset prices. In the process, PASS1 generates a new copy of XDB containing ACQUIRE transactions allocating portfolio earnings based on any REINVEST transaction or default.

In a second pass, module PASS2 uses those approximate prices to value portfolio assets. Asset valuations are used to approximate the total amount of offers to lend to each entity, by maturity and interest rate. This information is made available to potential large borrowers to provide them with a brief opportunity to update their bids to borrow money, as expressed in appropriate ACQUIRE transactions. These transaction updates are input to XACT to update the XDB. This does not necessitate a full pass through XDB, but only those tapes containing transaction data for potential large borrowers, i.e., governments, and perhaps financial institutions or enterprises, as discussed above. The second pass asset valuations are also used to create a Delegation Offer File (DOFF) of all offers to delegate. Module DELCOMP sorts DOFF and then calculates the two compensation thresholds for each delegatee by asset amount and earnings in accordance with the embedded marketplace for investment authority.

Module PASS3 uses the delegatee compensation thresholds to determine which delegation offers are actually consummated, and generates a second approximation of asset prices.

During the fourth pass, PASS4 uses the second approximation prices to determine whether to use a price-dependent ACQUIRE transaction or an available alternative specified in an immediately following ELSE transaction. Since the second pass prices were still approximations, the price dependencies of ACQUIRE transactions must also be understood as being approximate. The prices generated upon completion of this third pass are final prices "as of" the investment cycle date.

Module PASS5 conducts a fifth and last pass to execute transactions as appropriate, update portfolio valuations, and create a Disposition File (DF) containing records of assets to be dispensed by custodial financial institutions.

The Disposition File (DF) is input to module DISPOSE which sorts it and outputs a tape/diskette and/or report of the appropriate records for transmission to each financial institution. Each financial institution in turn notifies the individuals or organizations entitled to the proceeds of consummated transactions, and makes funds available as scheduled, either as a principal or as an agent of the government, depending upon its category.

It should be noted that the above description is based on an investment cycle, rather than continuous order matching. This is to permit the tool to be operated using minimal computer, communications and financial intermediary infrastructure when privatization is first begun, without sacrificing any significant features of a fully developed market resolution system. However, this tool can also be used as a real-time market system by reducing the period of the investment cycle from months, weeks or days to a brief interval defined by a sufficient number of newly-submitted transactions to ensure sufficiently well-behaved characteristics of the pricing behavior of a sufficient subset of the support assets.

The batch mode investment cycle is adapted to a real-time system in a straightforward manner. The generation of the sorted and comprehensive Transaction Data Base XDB using transported physical media and off-line terminal entry described in FIG. 5 is replaced with real-time transaction entry into an electronic network which channels the submitted transactions to a central computer. The electronic network may be implemented hierarchically, with each level in the network consolidating inputs into smaller numbers of outputs, finally producing a transaction file on the central computer. It is possible to use the Simulate command of the PRIVATIZATION PLANNER™ (a system to help plan for privatization) tool implemented on an electronic network with appropriate security precautions to provide an input interface into even an actual, rather than simulated PRIVATIZE!™ (a new system to achieve universal privatization) system.

The central processing is then expedited for real-time responsiveness by: 1) sequestering modules such as AUCTION and EVOTE which have no inherent need to participate in a real-time market, even though they too can be more useful being implemented as part of a responsive electronic network; 2) deferring, as appropriate, relatively time-insensitive transactions such as BANK, DELEGATE, DIVIDEND, GRADE, JOIN, LEAVE, OVERSIGHT, PERCENTAGE, REINVEST, TRANSFER, WHEN, for example to off-hours processing on a daily cycle; 3) aggregating the assets under delegated investment authority into a composite synthetic portfolio for each delegatee-organization, able to be partially or completely segregated into individual portfolio-owner accounts either periodically or as needed; 4) relocating information storage to speed access by taking advantage of the smaller absolute quantities of data being processed over shorter intervals, for example relocating the Transaction Data Base XDB from high capacity tape to disk, and relocating files such as PRICES and ORDERS from disk to main memory, along with periodic archival of such files to higher-capacity media; 5) configuring a powerful real-time central computer or set of computers, and in addition optionally exploiting parallelism inherent in the task, such as transaction front-end preprocessing, asynchronous period-sampling as described below, or any element of first-approximation independence of separate asset prices—for example one processor could be the initial co-recipient of all transactions involving government debt, along with the one or more processors designated as the initial recipient of one or more other assets involved in the exchange; and 6) in addition, the amount of processing power required to achieve convergence of price estimates is reduced because the initial price estimates, which are set equal to the most recent prices, will normally be closer to final price estimates over shorter intervals. The above-mentioned modules are described in detail below.

Successful convergence is determined by analyzing the pattern of final asset price estimates over a sequence of sampling periods which each start at the end of the previous investment cycle but successively add an additional very small interval measured either in time or quantity of newly-arrived transactions, as adaptively optimized, but at least equal to the amount of time needed to complete the process of price estimation for the previous period unless parallel processor with shared information a synchronously sample cumulated transactions.

The price estimate for an asset converges sufficiently when the deviation between the previous price and the price estimate for the first sampling period, or between the price estimates for a number of successive sampling periods, is within acceptable bounds based upon recent experience with that asset. A new investment cycle is closed when a sufficient number of asset prices converge. Transactions involving only assets whose price estimates have converged are executed, being consummated if their price conditions are met, and being retained for inclusion in future cycles if not—unlike the default operation in batchmode operation, described above. Transactions involving assets whose prices have not converged are retained for inclusion in future cycles. Transactions involving only assets whose price estimates have converged in the above sense include ACQUIRE transactions, even if an associated ELSE transaction refers to nonconverged assets, but exclude ELSE transactions if an associated ACQUIRE transaction refers to nonconverged assets.

Transactions entered into the real-time system can incorporate a field containing a "good 'til canceled" (GTC) flag or a "good until" time which specifies the time at which the transaction is to be cancelled, with the default normally being cancellation at the end of a normal daily market cycle. It is also possible for transactions entered into the real-time system to incorporate a "stop price" which triggers the transaction to be executed "at the market" at any available price. However, the expected best method of implementation, at least in markets without sufficient liquidity, is to not allow "stop" orders or "market" orders, but rather to require each price order to have a "limit price" which must be at least satisfied before the transaction is consummated. Note that like in real-time mode, batch mode regulations may constrain the usage of "market orders" or constrain prices by setting "price limits" over time intervals beyond which transactions are not allowed to be consummated.

The system promotes the liquidity needed for a successful real-time system. Owners of portfolios have access to an effective tool to continuously bid and offer assets as desired. The government or individual enterprise can continuously offer debt or indexed debt, adjusting the offered price, i.e., the interest rate, and offered quantity as desired. The government and approved financial institutions can continuously offer annuities, also adjusting the offered price, i.e., the implicit interest rate, and offered quantity as desired. The government can post standing offers of blocks of shares of enterprises in which it wants to increase private holdings at prices it is able to continuously adjust, and can place standing bids for enterprise shares if it chooses to support those share prices or buy back shares at price levels it considered unrealistically low in a market sense or unacceptably low in a policy sense. Enterprises are able to market blocks of their shares to the public, to bid for blocks of their shares, for example in a "going private" process or as part of corporate finance strategy, or to engage in trading in other enterprise shares as allowed by any governing regulations. Enterprises may offer new shares intended to raise capital, or may offer with government approval shares held by the state.

Delegatee-organizations are able to function anywhere on the temporal investment spectrum consistent with their representations to the public in their disclosure documentation, including position trading, day trading and scalping. Since delegatee-organizations will be highly motivated to maximize either their total investment return or their assets under management, there are strong incentives form them to find, exploit and in the process reduce inefficiencies in price discovery among the various assets on the system, including SMUs and individual enterprise stocks. In addition, it is possible for the government to encourage market-makers pledged to enhance liquidity in specific assets by various incentives, such as favorable tax treatment of income, or delegations of possibly large blocks of government assets including the particular sets for which the market-maker has assumed some responsibility, conditioned upon their performance in achieving objectives such as helping stabilize price trajectories or marketing state-owned assets to private investors.

Even individual portfolio owners with access to an effective electronic network will be able to submit real-time transactions. For example, if the French government vested parts of large state enterprises in the entire citizenry, individual citizens could access the PRIVATIZE!™ (a new system to achieve universal privatization) tool through a network like Minitel.

This promotion of liquidity by the system not only improves the prospects for a successful real-time marketplace, but also improves the character of the marketplace in batch mode. In fact, the two modes are not inconsistent. The real-time mode provides a very broad and virtuously continuous investment opportunity set to a set of sophisticated market participants, even relative to modern market economies, and the batch mode provides periodic low cost access to the marketplace to a broad cross-section of citizens with a typically longer investment horizon.

DETAILED DESCRIPTION—SECTION II

A detailed description of one embodiment of the adaptive knowledge base invention, pertaining to the process of policy formulation for privatization in newly democratic nations, follows:

Privatization Planner(tm)

(a system to help plan for privatization)

Adaptive Knowledge Base

TABLE OF CONTENTS

1. Introduction
2. Operation of Privatization Planner(tm) (a system to help plan for privatization)
   A. From the Perspective of an Individual User
   B. From the Perspective of the System Manager
3. Description of User Commands
   A. Summary of Commands
   B. Documentation of Commands
4. Knowledge Base Adaption
   A. Parameters Used to Evaluate Alternatives
   B. Algorithms Used to Evaluate Alternatives
5. Estimation of User Evaluations

1. Introduction

Privatization Planner(tm) (a system to help plan for privatization) implements a truly adaptive knowledge base. Users can review, evaluate and contribute to the structured information. Their contributions are in turn evaluated by other users. Such evaluations determine which portions of the knowledge base survive into future generations. This software technology is a tool which transforms the knowledge of a user community into a dynamically growing and evolving knowledge base.

Privatization Planner(tm) (a system to help plan for privatization) also incorporates a process to effectively access knowledge base entries. For example, assume that one node of the knowledge base is a bibliography containing thousands of books or articles as subtopics. The first access technique is via hierarchical topics, distinguished by allowing pages of information to be associated with each topic mode and not just the terminal nodes. Once the bibliography topic is selected, the challenge remains how to effectively access the thousands of subtopics.

A very large number of (for example) bibliographic subtopics can be effectively accessed by (see the Order command):

1. Finding all works posted after a given date;
2. Finding all works matching a given set of key words;
3. Selecting only those works previously evaluated within a certain range by a specified user or users;
4. Selecting only those works whose actual or estimated evaluation by the user himself or herself is within a certain range;
5. A combination of the above choices.

The selected subtopics can also be sorted by date, other user(s) evaluations, or actual/estimated evaluations of the user himself or herself.

Privatization Planner(tm) (a system to help plan for privatization) can be implemented on diskette or other physically transported media, or by an electronic network. In either case, the implementation can be hierarchical, with nodes of computers collecting contributions and evaluations which are periodically aggregated by the computer at the parent node. The preferred implementation is a combination of both approaches, with physical media periodically integrated into an electronic network knowledge base.

2. Operation of Privatization Planner(tm) (a system to help plan for privatization)

A. From the Perspective of an Individual User

Access to the hierarchical knowledge base is provided either by an electronic network or by physical media such as diskettes or CD-Roms. The user first copies the knowledge base onto a hard disk when available (for physical media rather than electronic network), and types "ndn". The system then displays a welcome screen, and prompts as necessary:

Enter disk drive for ndn file [e.g., 'c:']:

Enter directory of ndn file [e.g., 'ndn']:

At this point, the program displays the top of the hierarchical "table of contents" in "page mode", and awaits user commands.

Upon completion of the user's review, the knowledge base will include his or her evaluations and proposed changes. The user then copies the knowledge base back to diskette and forwards it to the system coordinator for compilation and analysis.

B. From the Perspective of the System Coordinator

The job of the system coordinator can be parsed into a series of tasks:

i) The current version of the executable program file and the hierarchical data base is made available to a select set of interested and knowledgeable users.

ii) The users explore those portions of the data base which are of relevance and interest to them. In the process, they have the ability to enter their opinions for the values of variables, to evaluate and comment on topic layouts and page contents, and to propose additions, replacements or deletions to topics and/or pages.

iii) For physical media users, those media are returned to the system coordinator, who aggregates them by copying directories and files onto a disk partition, and then onto a composite diskette or diskettes. The composite diskette(s) are then redistributed for evaluation and comment. Note that if necessitated by the quantity of information, different subsets of the composite data base can be distributed to different users based on their expressions of interest for this evaluation phase.

A set of diskettes is then prepared for each contributor, including his or her own topic setup and page contents, and all the feedback it generated (evaluations, comments and entries for values of variables). This contributor is then given an opportunity to make modifications based on that feedback, and return a new version to the system coordinator.

iv) The system coordinator again copies directories and files onto a disk partition, and then runs the following modules when available:

"vacuum", which cleans out all unused files and directories;

"evaluate", an optional step which tags the nodes of the hierarchical data base with values calculated according to the scoring parameters arid algorithms then in effect;

"select", which copies to diskette(s) several versions: the optimal (default) version of the hierarchical knowledge base, contributions from the H highest-evaluated users, and contributions from other users as a probabilistic function of their evaluations arid the user's interest in those topics.

v) The selected versions are then distributed at the start of a new "generation", corresponding to step (i).

vi) The security system for diskette (or other physical medium) amounts to transmission to and from known users. The software supports the ability for each distributes to circulate the original diskette or a copy of it among additional users (who would have the same ability). However, since all the users of a given physical diskette would have the ability to alter or override each other's responses, this should be limited to knowledgeable and interested persons in a position of privacy to the original distributee.

In addition, where the system is used in a "closed end" automatic optimization mode, where the evaluations of a known set of users determine the versions preserved into subsequent distribution cycles, if the distributes includes additional users then a single "optimal" representation of the distributee's entire group can be formulated.

For implementation on an electronic network, physical distribution of diskettes is unnecessary and standard security procedures for access and login would apply. In addition, an on-line system can make available to each user the entire knowledge base and all proposed contributions.

3. Description of User Commands

The adaptive knowledge base is organized into topics and pages, with two corresponding modes of operation. In topic mode the hierarchical organization of topics covered in the system can be displayed and altered. It can be thought of as an interactive, hierarchical table of contents. In page mode the contents of pages of information relevant to the current topic within the hierarchical knowledge base can be displayed and altered. The topic can be thought of as part of the table of contents, while the pages are the actual information addressed by that table of contents.

A. Command Summary

A Add a topic or page (e.g., A2 adds before second one).

B Back to previous screen of topics, if can't fit on one screen.

C Customize user's setup.

D Delete a topic or page (e.g., D2 deletes second one).

E Evaluate a topic or page (prompts for 1–5 rating and comment).

F Forward a screen of topics (when can't fit all on one screen).

G Goto a previously Labelled topic (e.g., Gbiblio).

H Help explains available commands.

I Interest level in topic(I1: no interest, I5: most interested).

J eJect page from laser printer.

K Keyword definition or invocation.

L Label the current topic (e.g., Lbiblio).

M Map display of current region in data base.

N Name the current topic differently.

O Order the current subtopics (i.e., filter and sort).

P Page.Switch to Page mode,or display Page X (e.g., P2).

Q Quit the knowledge base.

R Replace topic or page (e.g., R2).

S Simulate the Privatize!(tm) (a new system to achieve universal privatization) computerized marketplace.

T Topic. Switch to topic mode, or display topic (e.g., T2).

U User. Topic/page version in topic mode. Values in page mode.

V Values. Entry of user-specified values embedded in pages.

W Write a message to a specific user or set of users.

X eXit Customize, Help, Map, Order, Simulate & Write commands.

B. Documentation of Commands

Add

Syntax: A or Axx where xx is between 0 and the number of topics or pages available at this level in the hierarchy.

This command allows a user to add a topic or page at the current level in the hierarchy.

A appends a new topic or page after existing topics.

Axx adds a new topic or page before number xx, except "A0" is equivalent to "A".

After creating a new topic, the user is prompted to enter its name.

Error condition:

1. If xx specifies an unavailable topic or page, the user is notified and prompted to try again.

2. While one user may view another user's topic organization or page contents, modification of them is not allowed.

Back (and Forward)

Syntax: B or Bxxxx; F or Fxxxx

If there is a large number of subtopics at a given node, the Back and Forward commands allow a user to effectively move through them.

For example, if the user is currently displaying the 500th to 520th subtopics, then issuing B will reposition the display to the 480th to 500th subtopics, and issuing B15 will reposition the display to the 15th to 35th subtopics.

If the user is currently displaying the 1200th to 1220th subtopics, issuing F will reposition the display to the 1220th to 1240th subtopics, and F2000 will reposition the display to the 2000th to 2020th subtopics.

Customize

Syntax: C

Customize allows a user to tailor system options to his or her preferences. It can be invoked immediately after login, or at any time subsequently from any directory topic and is terminated with the eXit command. System default options are overridden when the user enters new options. The user's choices are given effect for the current directory and all subdirectories, unless overridden by a later Customize command. A system parameter determines whether or not a Customize command for a given directory overrides previously entered Customize commands for its subdirectories.

Customize is implemented by copying into the current directory (if not previously copied) a template Customize subtopic of the System topic in the root directory, along with an explanatory page with embedded values for different options.

The specifiable options, which the system prompts for, include:

1. Identification of user contributions, which allows a user to remain public (the default), have the system select an alias by which his or her contributions can be accessed by others, or to become private to prevent access by others.

For example, a user could choose to be private for a particular bibliography directory while develop ing and implementing a new keyword design, and then go public at a stage suitable for review by others.

2. Changing parameters "alpha", "beta" and "gamma" used to correlate user evaluations to evaluations entered by others. For a description of these parameters, see the documentation of the "Order" command.

3. For diskette (and other physical media) users (rather than electronic network users), specifying the type of medium (physical size and storage capacity) and the maximum number (e.g. of diskettes) to be sent. If the entire knowledge base and all proposed alternatives exceed this size, topics of no interest will be excluded and alternatives will be probabilistically included as a function of the user's interest level in particular topics (see the Interest command).

Delete

Syntax: Dxx where xx is between 1 and the number of topics or pages available at this level.

This command allows a user to delete a topic or page in the current level in the hierarchy.

Error Conditions:

1. If xx specifies an unavailable topic or page, the user is notified and prompted to try again.

2. While one user may view another user's topic organization or page contents, modification of it is not allowed.

Eval

Syntax: E

This command allows a user to evaluate the organization of the current topic or the contents of the current page, and to enter any comment on it.

The program first requests an evaluation as follows:

Please evaluate this topic/page (1=very poor, 5=very good):

The user has the option to enter a number from 1 to 5 (3 being neutral).

The Program Then Requests Any Comment:

Please enter any comment on this topic:

The user then has the option to enter a comment, terminated by a "carriage return" or "enter" keystroke.

Error Condition:

If the logged-on user is in his or her own setup, the Eval command is unavailable.

Forward

Syntax: F or Fxxxx

See the Back command for a description of the Forward command.

Goto

Syntax: Gxxxx

The Goto command repositions the user at the node in the hierarchical knowledge base previously "Labelled" as xxxxx. Therefore, it is convenient to Label topics which a user expects to return to repeatedly. Labels which begin with the character "." are considered temporary, in the sense that they can be overwritten without warning if the space is needed by new labels.

Labels are stored in the page(s) associated with the Label subtopic of the System topic in the root directory. The user can directly review the labels by selecting this Label subtopic arid switching to page mode. This is how the user chooses which permanent label(s) to delete (by blanking the label field) when all slots are so used.

Error Condition:

Attempting to define a new label after more than a predetermined number (initially set to 20) of permanent labels has been defined for a particular user.

Help

Syntax: H or Hx

The Help command provides on-line documentation of potential commands to the user. It is terminated by the eXit command.

H positions the user in the Help subtopic (of the System topic in the root directory), which displays a list of commands with brief descriptions which the user can select in order to inspect their page(s) of documentation.

Hx positions the user directly in the starting page of documentation for the subtopic associated with command x.

Interest

Syntax: I or Ix

The Interest command allows a user to specify his or her degree of interest in a topic and its subtopics. If the user enters I, the system prompts for the interest level x (1 indicating no interest, 5 the most interest).

For a diskette (or other physically transported medium) user, if the knowledge base size exceeds the maximum number of diskettes specified in the Customize command, then topics of no interest will be excluded and alternatives will be probabilistically included as a function of interest level in particular topics.

Keyword

Syntax: K (or Kxxxx, etc. see below) (from topic), or:

Kxxxxx=S Kxxxx=U Kxxxx=yyyy (from subtopic).

Keywords are generated or reviewed by entering the command K, which switches the user to the keyword topic in the current directory (copied from a template in the root directory when necessary). The keyword topic has an explanatory page with embedded values for different keywords, with keywords contributed by different users accessible via the User command just like other embedded values. Keywords defined in the root directory are accessible from any subdirectory, but keywords defined in a "keyed" directory other than the root apply only to immediate subdirectories.

The command Kxxxx (or Kxxxx=S?) from a topic will filter out all subtopics which do not match keyword xxxxx; the command Kxxxx- (or Kxxxx-S? or Kxxxx=U?) filters out all subtopics which do match keyword xxxxx; the command Kxxxx=yyyy? filters out all subtopics which do not match the yyyy value for keyword xxxxx; and the command Kxxxx-yyyy? filters out all subtopics which do match the yyyy value for keyword xxxxx. Successive keyword commands before moving up and out of the "keyed" directory successively filter out additional sets of subtopics.

The entry for each keyword consists of the keyword itself, a description of its meaning, and an optional boolean text specification. This specifies those words which must be present or not in the subtopic's name or page information in order for it to be accessed by the keyword. However, this "first approximation" of whether a particular subtopic matches a particular keyword can be overridden by entering:

Kxxxx=S or Kxxxx=U from the particular subtopic itself, where xxxxx is the keyword, S is the flag for "Set" (meaning that subtopic will be accessed by the keyword), U is the flag for "Unset" (meaning that subtopic won't be accessed by the keyword). Kxxxx=yyyy is issued in a subtopic for multi-value keywords (e.g., Kcountry=US).

Note that the evaluation by other users of a Keyword page applies not to the page itself, but rather to the keywords proposed by the user whose embedded values (keywords) are displayed. The keywords are ranked (e.g., by summing the signed deviation of their evaluations from the average evaluation of 3), and the best are then presented as future defaults.

Label

Syntax: L or Lxxxx, Description

The Label command works in conjunction with the Goto command. The Label command associates the location of the current node with the identifier xxxx, so that Gxxxx will return the user to that location.

If the user enters L, the system prompts for the label itself and a brief description of the node. It will then place that information in page(s) associated with the Label topic in the root directory.

Note: If the label xxxxx starts with a ".", it is "temporary" and subject to being overwritten without notice by new labels if there are no free slots. If the user requests a new label after all his or her slots are filled with "permanent" labels (not starting with "."), the system requests that the user inspect the pages of the Label topic and blank out unwanted labels to free up space.

Map

Syntax: M

The Map command displays the environment of a node by showing the ancestory of that topic up to the root directory. It is terminated with the eXit command.

Note: Subtopics are already listed when viewing a node in topic mode, and "siblings" can be seen by stepping up one level in the hierarchy with the T command.

Name

Syntax: N

The user is prompted to enter a new name for the current topic.

Note: to change the name of one of the subtopics of the current topic, that subtopic must first be invoked with the "Topic" command before using the "Name" command. While that subtopic could have been replaced without changing to it, its contents or "pages" of information would have been lost.

Error Condition:

A user is not allowed to modify another user's topic.

Order

Syntax: O or Oxxxx

The Order command supports filtering and ranking a large number of subtopics, using entry dates, keywords, other users' evaluations, and estimates of the current user's own actual or estimated evaluations. It is terminated by the eXit command.

Order is implemented by a subtopic of the System topic in the root directory, with an explanation page with embedded values for different choices. Oxxxx (where xxxxx has been defined in a previous Order command) results in the system performing the specified filtering and sorting on the subtopics of the current directory. O (or Oxxxx where xxxxx has not been previously defined) results in the system displaying the appropriate page with instructions.

The first values to be entered are the label for this particular Order arrangement, and any optional description. Next, the user is prompted to enter the range of posting dates to consider (e.g., to check only previously-unreviewed subtopics). The next prompt is for those keywords which must all be matched. Alternatively, more general boolean logic could be used. The user then has the option to specify a range of evaluations in which he or she is interested, either by a specific user or all users averaged. Alternatively, specified subsets of users could be averaged. If the evaluation of a specific subtopic falls outside this range, it is filtered out. The next prompt is for the range of the user's own evaluation, either entered previously by the user or estimated from other users' entries by regression analysis (see section 5).

Note that a user will be motivated to enter some evaluations, since only by correlating those entries with other users' evaluations can the system respond with an estimated evaluation for subtopics which the user hasn't yet evaluated. This also allows the system to post cross-correlations (between this and other users' evaluations), which can then be displayed and used as a sort key when selecting which other user's version to inspect.

The user also has the option to multiple-sort the filtered subtopics by date of posting, evaluations by other users, his or her own actual or estimated evaluations, or by subfields of the subtopic name (such as title or author of works in a bibliography).

Note: Alternatively, boolean combinations of date, other evaluations and user evaluation conditions can be supported. E.g.: date within the last week; AND ranked at least superior by a specific other user OR else by all users averaged; OR estimated to be ranked above average for the user himself or herself; with sorting by the user's own actual/estimated evaluations.

Page

Syntax: P or Pxx

Topic mode

In topic mode, the P command allows the user to switch from topic mode to page mode. (Topic mode is used to view or alter the organization or hierarchy of the information base, while page mode is used to view or alter the actual contents of a particular topic in the hierarchy.)

Page mode

In page mode, the P command displays the next page, and Pxx displays page xx. The system notifies the user if the requested page doesn't exist.

Quit

Syntax: Q

This command gracefully terminates operation of the program, returning the user to the operating system.

Replace

Syntax: Rxx where xx is between 1 and the number of topics or pages available at this level.

This command allows a user to replace a topic or page in the current level in the hierarchy.

Error Conditions:

1. If xx specifies an unavailable topic or page, the user is notified and prompted to try again.

2. A user may view but not modify another user's topic organization or page contents.

Simulate

Syntax: Sxxxx

This command allows a privatization policy-maker or policy analyst to participate in a simulation of the algorithms and processes of the Privatize!(tm) (a new system to achieve universal privatization) computerized marketplace. It is terminated by the eXit command.

If Simulation xxxxx has not yet been initiated, the system asks whether the user wishes to initiate a new privatization marketplace simulation by performing the role of "government". If so, the user is repositioned into the Simulation xxxx Setup subtopic (whose "ancestory" is root\Utility\Simulation\Simulation xxxx). There, the user, as "government", specifies (as embedded values in the associated page(s)):

- ids of eligible participants (or can allow anyone to participate) and optional "personae";
- ids and descriptions of eligible delegatee-organizations (when the Delegate transaction is supported);
- supported transactions and assets;
- initial endowment of participants and any subsequent privatization transfers (or levies like fees or taxes);
- default period of investment cycle (measured by time interval or cumulative number of submitted transactions);
- general announcements to participants.

Note that the individual participants and the government can communicate directly via the Write command. For example, a user wishing to be approved as a delegatee-organization could submit descriptive qualifying data. If the "government" approved, that user would be added to the list of delegatee-organizations.

If a user-"government" has already set up Simulation xxxxx, then the user issuing the Sxxxx command is repositioned into the Simulation xxxxx topic arid selects one of the following subtopics:

1 Simulation xxxxx Setup
2 Simulation xxxxx Price History
3 Simulation xxxxx Portfolio History The Setup subtopic displays the simulation framework as specified by the "government". The Price History subtopic has pages of information containing asset price data for each investment cycle, calculated by periodically executing the Privatize!(tm) (a new system to achieve universal privatization) simulation. The Portfolio History subtopic has pages containing portfolio and transaction data, by user, for each investment cycle. The transaction data is tagged as consummated or not by the periodic simulation. In each case, the data is represented by embedded values under the "government" id, except for the portfolio history data under each user's own id.

Topic

Syntax: T or Txx

Page mode

In page mode, the T command switches the user to topic mode. (Topic mode is used to view or alter the organization or hierarchy of the knowledge base, while page mode is used to view or alter the actual contents of a particular topic in the hierarchy.)

Topic mode

In topic mode, this command allows a user to move about in the organizational hierarchy of topics.

T steps up one level in the hierarchy by invoking the next higher topics.

T0 invokes the root topics at the top of the hierarchy.

Txx selects the specified subtopic from among the displayed selections, where xx is between 1 and the number of available subtopics.

Note: If the subtopic name begins with "EXECUTE xxxxx", then Privatization Planner(tm) (a system to help plan for privatization) will store in a file the user's current position in the knowledge base (along with other information), and begin execution of program module xxxxx (for instance a gateway program into another information network or a market analysis program which charts prices or otherwise analyzes price history in support of trading decisions). Upon completion of program xxxx, the user types (at the operating system prompt) "RESUME", which reads the file updated by the EXECUTE xxxx subtopic in order to restore the user to the same position in the knowledge base.

Error Conditions:

If xx specifies an unavailable topic, the user is notified and prompted to try again.

User

Syntax: U or Uid;

where id corresponds to the character string identifying a particular user.

If "U" is entered without an id, the system presents the id and name off each available user (optionally sorted by cross-correlation with the requesting user), and provides an opportunity to select each in turn.

If "U" is entered with an id, the system verifies the id is accessible and then presents information appropriate to that user.

Topic Mode

If the id specified in the "U" command does not correspond to that of the logged-on user, he or she will be prevented from executing Add, Replace, Delete or Name commands.

On the other hand, if the id specified in the "U" command corresponds to that of the logged-on user, he or she will be given an opportunity to "adopt" the organization and contents, for the current topic, of either the default version or the version another user.

The system first informs the logged-on user whether he or she already has a personally customized setup for the current topic. It then asks whether the logged-on user wishes to "adopt" as his or her own, and therefore accessible to future revision, the default topic organization and page layout or that of another user.

Page Mode

The User command in page mode allows the logged-on user, who is accessing the page contents of a second user's (or his or her own) topic setup as determined by the latest User command in topic mode, to view the entries of still a third user for the values of variables embedded in the page.

While the User command in page mode does not invoke a different user's organization or contents, the form and usage are exactly analogous to that in topic mode.

Values

Syntax: V

Each page can contain a series of variables embedded within the text, demarcated by a pair of braces "{ . . . }". This command allows each logged-or user to enter his or her own judgment as to the best values for those variables. Each variable can be of arbitrary length and can take on the value of any sequence of alphanumeric characters.

The program will highlight each variable in turn, and prompt the user for a new entry. The user need not enter a value for all or any variables. On the other hand, if a user's judgment should change, additional subsequent entries supersede earlier ones.

Write

Syntax: Wxxxx

The Write command allows a user to send a message to a specific user. It is implemented using the Message subtopic of the System topic in the root directory, and is terminated with the eXit command.

The user types the message into a new page associated with a new entry at the Message node. This will be stored under the recipient's ID, and is the only time one user can alter information stored under another user's ID. The other user reads any messages by logging on, viewing the Message directory, and selecting messages to read from the list of subtopics.

After reading a message, the recipient can respond to it with another Write command and delete it with the Delete command.

eXit

Syntax: X

The eXit command terminates operation of the Customize, Help, Map, Order, Simulate and Write commands.

4. Knowledge Base Adaptation

A. Parameters Used to Evaluate Alternative Versions

The scoring algorithms rely on the evaluation of topics and pages. Three parameters are used in the process of transforming the set of evaluations into composite scores.

The first parameter relates to the issue of quality versus quantity. A purely "intensive" scoring system would score ten high quality pages of information equally to one such page. On the other hand, an "extensive" scoring system would score two mediocre pages twice as high as one.

On the assumption that the value of the data base is a combination of its quality and quantity, the parameter "extensively" achieves this as follows:

value=(quality score)×(measure of quantity)^{extensivity} or value=(quality score)^(1−ext.)×(measure of quantity)^(ext.)

where both the quality score and the measure of quantity are greater than or equal to one, and the extensively parameter is in the range from 0 (i.e., only quality matters) to 1 (i.e., the score is proportional to quantity).

Parameter "content" fixes relative weights of organization and content:

topic value=("content")×(evaluation of aggregated subtopic content)+(1−"content")×(evaluation of organization)

where the parameter "content" is between 0 (i.e., only organization matters) and 1 (i.e., only content matters).

The final parameter "persist" increases the valuation of each component of the benchmark version, to require that a threshold of improvement be exceeded before changes are adopted:

(benchmark valuation)=(benchmark valuation)(1+"persist"/100)

B. Algorithms Used to Evaluate Alternative Versions

The scores of topics are built up from the scores of components such as subtopics and pages.

The score of any given page VAL(page) is the average of all submitted evaluations, optionally deleting the X% highest and lowest scores to decrease the sensitivity to outlier evaluations. The score of the set of pages ("PMAP") constituting the content of a topic is:

VAL(PMAP)=(average VAL(page))×(number of pages)^extensivity or

VAL(PMAP)=(average VAL(page))^(1−ext.)×(number of pages)^ext.

The value of a set of subtopics is then:

$$VAL(\text{subtopics}) = (\text{average } VAL(PMAP)) \times (\text{number of subtopics}) \wedge \{\text{extensivity}\} \text{ or } (\text{average } VAL(PMAP)) \wedge (1\text{-ext.}) \times (\text{number of subtopics}) \wedge \text{ext.}$$

The value of a topic can then be calculated as:

VAL(topic)=("content")×(VAL(subtopics))+(1−"content")×(VAL(SMAP))

where SMAP is a given arrangement of subtopics, and VAL(SMAP) is the average evaluation of that organization.

5. Estimation of User Evaluations

Privatization Planner(tm) (a system to help plan for privatization) provides a user the ability to select and sort entries based on his or her own evaluation. If the user has not yet evaluated a particular entry, the system can provide an estimate derived from a regression analysis of entries which the user has evaluated versus other users' evaluations.

The estimation method is:

1. Formulate the two-dimensional evaluation array $E_{ij}$, where i is the user index (u being the index for the user whose evaluations will be estimated) and j is the observation index.
2. Formulate the one-dimensional array $W^u_j$ as follows:

$$W^u_j=1+|E_{uj}-E_j|^\alpha$$

if there is an actual observation for $E_{uj}$, and $W^u_j=0$ otherwise.

In this expression, α is a user-specifiable parameter whose default value is 0. This weight function, which provides the ability to weight more heavily observations where the user's evaluation differed most from the average, can be replaced by other weight functions.

3. Formulate the one-dimensional array $W^i_j$ for each i≠u as follows:

$W^i_j = W^u_j$ if there is an actual observation for $E_{ij}$, $W^i_j = 0$ otherwise.

This ensures that there is a non-zero weight only where there are actual observations for both users u and i.

The preferred implementation is to already have summed the number of actual evaluations for each user, and to presort them by descending number, and then only consider the first X percentile according to processing power and response time constraints.

4. Perform a regression of $E_{uj}$ vs. $E_{ij}$ with weights $W^i_j$. The default functional form is linear as follows:

$$E_{uj} = m_i E_{ij} + b_i,$$

although other functional forms such as polynomial or logarithmic are possible.

The preferred implementation is to first form two sums:

"regression observations"$=\Sigma_j W^i_j$, and

"# predictions"=number of instances where there is no observation for user u (and therefore needing an estimate) and there is an observation for user i (and therefore able to provide an estimate).

Then, the regression analysis is performed only against those users i for whom the two sums are in top Y and Z percentile respectively, or alternatively is not performed against those users i for whom those two sums are in the bottom Y and Z percentile respectively.

5. The estimate for each observation j which lacks an actual evaluation by user u is found by:

$$E_{uj} = \frac{\sum_{i \neq u} |r_i|^\beta \left[\sum_j W_{ij}\right]^\gamma E_{ij}}{\sum_{i \neq u} |r_i|^\beta \left[\sum_j W_{ij}\right]^\gamma},$$

where $r_i$ is the correlation coefficient for the selected functional form regressing $E_{uj}$ vs. $E_{ij}$;

β is a user-specifiable parameter, whose default is 1, able to modulate the weight of the correlation coefficients;

γ is a user-specifiable parameter, whose default is 1, able to modulate the significance of the sums of the weights of the observations used in the regression.

Notes: 1) This approach reduces the severe multicollinearity problems which would result from a multiple-user regression analysis.

2) Other weight functions are possible. For example, the weight of the prediction of user i can be set to zero when user i and user u are anti-correlated (i.e., $r_i<0$) by replacing $r_i$ in the above formula with the term MAX(0, $r_i$). In addition, the user could restrict the regression analysis to a specified set of users.

Sample Screens

The following screens are examples illustrating typical screen layouts and page contents.

In order to double up screen output onto a laser printer, two additional commands have been implemented:

L draws a solid line across the middle of the page after the first screen has been printed;

F issues a form feed to eject the page after the second screen has been printed beneath the first.

---

Privatization Planner (tm) Fri Oct 16 00:46:21 1992

---

Privatization Planner (tm)

----You are wjh, looking at the default version, with default values----
This software package is designed to support the systematic formulation of privatization policy. An initial data base of information will provide a basic tutorial on the issues and options in privatizing large state enterprises.
Each "generation" a primary version and selected alternates will be distributed. Users can then evaluate and comment on the various screens and pages, and submit proposals for added, replaced or deleted screens and pages.
Based on the aggregated evaluations, inferior alternatives will be pruned before the next generation. Authors of retained information can be given the opportunity to edit their material based on the evaluations and comments received.
Enter command

| Page | Add | Re-place | De-lete | Val-ues | Eval | Screen | User | Help | Quit |
|---|---|---|---|---|---|---|---|---|---|
| 0–2 | 1–2 | 1–2 | 1–2 | | | mode | [id] | | |

---

Privatization Planner (tm) Fri Oct 16 00:47:12 1992

Privatization Planner (tm)

----You are wjh, looking at the default version, with default values----
S Next Higher Screen (S0 for Root)
1 Introduction
2 Methods of Share Distribution
3 Timing Considerations
4 Privatize! (tm) Customization
5 Administrative Information
Enter command

| Screen | Add | Re-place | De-lete | Title | Eval | Page | User | Help | Quit |
|---|---|---|---|---|---|---|---|---|---|
| 0–5 | 1–5 | 1–5 | 1–5 | | | mode | [id] | | |

---

Privatization Planner (tm) Fri Oct 16 00:52:00 1992

---

Transactions

----You are wjh, looking at the default version, with default values----
S Next Higher Screen (S0 for Root)
S1 ACQUIRE (attempt to obtain an asset in exchange for another)
S2 BANK (financial institution to process debt payments of an enterprise)
S3 CANCEL (cancel previous, unexecuted transactions)
S4 DELEGATE (delegate investment or voting authority over specified assets)
S5 DIVIDEND (total dividends paid by an enterprise to shares on the system)
S6 ELSE (alternative ACQUIRE transaction if first price contingencies not met)
S7 FILTER (delegatee orders to apply to selected portfolios or assets)
S8 GRADE (evaluation of financial institution)
S9 IDENT (identification of portfolio owner)
S10 JOIN (enterprise employee stock compensation and date of hire)
S11 LEAVE (date enterprise employee ceases employmnent)
S12 OVERSIGHT (dates of privatization and demonopolization; confiscation %)
S13 PERCENTAGE (minimum compensation acceptable to delegatee organization)
S14 REINVEST (specifies how portfolio earnings are to be invested)
S15 SECURITY (apply transactions to "social security" portion of portfolio)
S16 TRANSFER (transter specified assets to particular financial instituion)
Enter command

| Screen | Add | Re-place | De-lete | Title | Eval | Page | User | Help | Quit |
|---|---|---|---|---|---|---|---|---|---|
| 0–16 | 1–16 | 1–16 | 1–16 | | | mode | [id] | | |

-continued

Privatization Planner (tm) Fri Oct 16 00:52:25 1992

Assets

----You are wjh, looking at the default version, with default values----
S Next Higher Screen (S0 for Root)
S1 ALL (composite of all assets in portfolio)
S2 DXXXX (debt of specific borrower, as an asset in lender's portfolio)
S3 DIXXXX (debt indexed for inflation)
S4 EXXXX (stock in specific enterprise)
S5 FCXX (foreign currency)
S6 PAYOUT (generalized annuity)
S7 SMU (Stock Market Unit, basket of shares privatized by 199x)
S8 SMU2 (2d tranche of SMUS, basket of shares privatized between 199x and 200y)
S9 VOUCHER (privatization voucher)
S10 Virtual Asset - DR (donation "right" transferred to donor for gift)
S11 Virtual Asset - LSER (large state enterprise rights exchanged for SMUs)
S12 Virtual Asset - SSER (small state enterprise rights)
S13 Virtual Asset - TR (testamentary rights)
S14 Virtual Asset - VAL (value received external to the software system)
Enter command

| Screen | Add | Re-place | De-lete | Title | Eval | Page mode | User [id] | Help | Quit |
|---|---|---|---|---|---|---|---|---|---|
| 0–14 | 1–14 | 1–14 | 1–14 | | | | | | |

Privatization Planner (tm) Fri Oct 16 00:50:39 1992

Files

----You are wjh, looking at the default version, with default values----
S Next Higher Screen (S0 for Root)
S1 Disposition File (DF)
S2 Disposition File - Excerpts (DFXXXX)
S3 Delegation Offer File (DOFF)
S4 Delegatee Order File (DORF)
S5 Enterprise File (EPRISE)
S6 Order File (ORDERS)
S7 Asset Price File (PRICES)
S8 Transaction Data Base (XDB)
Enter command

| Screen | Add | Re-place | De-lete | Title | Eval | Page mode | User [id] | Help | Quit |
|---|---|---|---|---|---|---|---|---|---|
| 0–8 | 1–8 | 1–8 | 1–8 | | | | | | |

Privatization Planner (tm) Fri Oct 16 00:51:05 1992

Modules

----You are wjh, looking at the default version, with default values----
S Next Higher Screen (S0 for Root)
S1 ACTUARY (calculates periodic annuity payments)
S2 AUCTION (supports bidding with SMUS at small enterprise auctions)
S3 DELCOMP (calculates threshold delegatee compensation)
S4 DISPOSE (prepares transmittals to custodial financial institutions)
S5 DORFGEN (generates Delegatee Order File - DORF)
S6 EGEN (generates Enterprise File - EPRISE)
S7 EVOTE (supports polled shareholder voting)
S8 PASS1 (transaction processing: first pass)
S9 PASS2 (transaction processing: second pass)
S10 PASS3 (transaction processing: third pass)
S11 PASS4 (transaction processing: fourth pass)
S12 PASS5 (transaction processing: fifth pass)
S13 PRICING (determines market-clearing prices)
S14 XACT (generates the Transaction Data Base - XDB)
S15 XBLOCK (analyses a transaction block)
Enter command

| Screen | Add | Re-place | De-lete | Title | Eval | Page mode | User [id] | Help | Quit |
|---|---|---|---|---|---|---|---|---|---|
| 0–15 | 1–15 | 1–15 | 1–15 | | | | | | |

-continued

Privatization Planner (tm) Fri Oct 16 00:48:21 1992

Privatize! (tm) Customization

----You are wjh, looking at the default version, with default values----
S Next Higher Screen (S0 for Root)
S1 Files
S2 Modules
S3 Transactions
S4 Assets
S5 Financing the system
Enter command

| Screen | Add | Re-place | De-lete | Title | Eval | Page mode | User [id] | Help | Quit |
|---|---|---|---|---|---|---|---|---|---|
| 0–5 | 1–5 | 1–5 | 1–5 | | | | | | |

Privatization Planner (tm) Fri Oct 16 00:48:39 1992

Financing the system

----You are wjh, looking at the default version, with default values----
S Next Higher Screen (S0 for Root)
S1 Ceneral budgetary resources
S2 Enhanced tax collection over portfolio earnings
S3 Tax on portfolio assets
S4 Fee based on size of transaction block
S5 Fee based on number of transactions
S6 Fee to support enterprise votes
S7 Fee to register enterprise debt instruments
S8 Implicit Arbitrage Revenue
Enter command

| Screen | Add | Re-place | De-lete | Title | Eval | Page mode | User [id] | Help | Quit |
|---|---|---|---|---|---|---|---|---|---|
| 0–8 | 1–8 | 1–8 | 1–8 | | | | | | |

DETAILED DESCRIPTION—SECTION III

A detailed description of another embodiment of the adaptive knowledge base invention, pertaining to the pursuit of sustainable development, follows:

Sustainable Development Server(tm)

(an adaptive knowledge base to further the pursuit of sustainable development)

TABLE OF CONTENTS

Section
Table of Contents
1. Background
2. Conceptual Development of Sustainable Development
3. Sustainable Development Server(tm) (an adaptive knowledge base to further the pursuit of sustainable development): A Collaborative Knowledge Base
4. Operation of the Sustainable Development Server(tm) (an adaptive knowledge base to further the pursuit of sustainable development)
 a. From the Perspective of an Individual User
 b. From the Perspective of the System Manager
5. User Commands Available in Topic Mode
6. User Commands Available in Page Mode
7. Knowledge Base Adaptation
 a. Parameters Used to Evaluate Alternatives
 b. Algorithms Used to Evaluate Alternatives
Sample Screens

1. Background

It is natural for individuals and groups to aspire to a clean environment and economic development for themselves and their progeny. These aspirations are evolving into two new human rights norms: the right to a safe environment and the right to development. At the same time, these dual aspirations are combining into a duty of states to pursue sustainable development under a new international public trust doctrine.

The immediacy of this challenge is clear, as the human population grows past five billion individuals on a finite, irreplaceable planet.

Unprecedented cooperation between academe, government and industry will be necessary to learn the science, develop the technology, train the leaders, formulate the policies, coalesce the support and commercialize the products and services necessary to achieve sustainable development.

The Sustainable Development Server(tm) (an adaptive knowledge base to further the pursuit of sustainable development) is intended to serve as a focal point to facilitate the necessary development and interaction. Participants can review, evaluate and contribute to structured information in an adaptive knowledge base specializing in sustainable development. The philosophy of this approach is that the combination of powerful yet friendly software technology, an interesting, useful and well-structured initial knowledge base, and a knowledgeable and motivated user community, will yield a "critical mass". In this case, dynamic positive feedback loops will lead to improvements in the software technology, expansion of the knowledge base, and growth of the user community.

2. The Conceptual Development of Sustainable Development

It is not enough to identify the problem. Even if the pursuit of sustainable development becomes acknowledged as a policy imperative by the leaders in academe, government and industry, this must be translated into specific choices and concrete actions. Sustainable development must evolve beyond a cliche into a mature, operational concept.

One approach, following MIT economist Robert Solow, is to inventory all forms of capital and track whether they are increasing in the aggregate. From this perspective, a diminution in one form of capital can be compensated by an increase in another. For example, even economic development of part of a rainforest which was effectively invested in human capital through education could be consistent with sustainable development.

This aggregate-capital conceptual structure is outlined in FIG. 1. Capital assets (and liabilities!) are categorized into non-human assets (biological, environmental and natural resources) and human social assets (human resources, intangible products and tangible products). Assets (and liabilities) are subject to intra- and inter-category transfers by individuals and organizations.

Policy instruments such as regulations (e.g., prescriptive, performance, taxation) or the establishment of bundles of property rights along with their transfer mechanisms (e.g., gift, sale, rent) affect the behavior of individuals and organizations.

Taken together, sets of assets and associated policy instruments constitute portfolios. These portfolios can be associated with individuals, enterprises, countries, regions or the world.

A central focus of sustainable development is the choice of technique to value and to aggregate such portfolios, taking into account appropriate constraints imposed by distributional equity.

Sustainable Development From the Perspective of Aggregate Capital

| | Assets (and Liabilities) Non-Human Assets | |
|---|---|---|
| Biological Resources | Environmental Assets | Natural Resources |
| plant kingdom | capacity to degrade, | air |
| animal kingdom | dilute or store | water |
| ecosystems | harmful products | minerals |
| biomes | natural settings | land |
| | Human Social Assets | |
| Human Resources | Intangible Products | Tangible Products |
| population | architecture | agriculture |
| training | art | armaments |
| informal | government | consumer goods |
| health | knowledge | conveyances |
| vocational | languages | infrastructure |
| elementary | law | productive |
| secondary | literature | equipment |
| university | music | |
| continuing | performance art | |
| | technology | |

Policy Instruments regulation (e.g., prescriptive, performance, taxation)

establishment of bundles of property rights, along with mechanisms for their transfer (e.g., gift, sale, leasing, rent)

alternative valuations of assets (and liabilities)

Assets (and liabilities) are subject to intra- and inter-category transfers by individuals and organizations. These transfers are affected by the choice of policy instruments. Taken together, the assets (and liabilities) and policy instruments constitute a portfolio associated with individuals or groups. The valuation and aggregation of such portfolios, subject to appropriate equity constraints, is a central focus of sustainable development.

3. Sustainable Development Server(tm) (an adaptive knowledge base to further the pursuit of sustainable development): A Collaborative Knowledge Base A collaborative knowledge base is the product of a knowledge building community which constructs patterns of knowledge through sociocultural activity, while renewing itself through ongoing apprenticeship.[1] Education has typically involved the assignment of tasks or the orchestration of a novice's development.[2] In contrast, a knowledge building community helps novices "formulate their own goals, do their own activating of prior knowledge, ask their own questions, direct their own inquiry, and do their own monitoring of comprehension."[3] In the development of the science and policies to further sustainable development, collaboration is mutually beneficial as the knowledge base grows cumulatively, if not exponentially. Therefore, it is essential for representatives from academe, government and industry to coalesce into an effective knowledge building community.

[1]See M. Scardamalia, C. Bereiter, "An Architecture for Collaborative Knowledge Building" 2, in E. De Corte, M. Linn, H. Mandl, L. Verschaffel (eds.), "Computer-Based Learning Environments and Problem Solving", NATO-ASI Series F.: Computer and Systems Sciences (in press).

[2]M. Scardamalia, C. Bereiter, "Higher Levels of Agency for Children in Knowledge Building: A Challenge for the Design of New Knowledge Media", 1 (No. 1) Journal of Learning Sciences 37, 38–39 (1991).

[3]Id. at 39.

A knowledge building community of environmental and policy analysts can be promoted by the Sustainable Development Server™, a collaborative knowledge base generator. It is initialized with a hierarchy of topics containing pages of information. This knowledge base is distributed by the system coordinator to knowledgeable and motivated users by diskette, or made available on an electronic network. Users can then evaluate and comment on its organization and content or propose changes.

For example, the first menu of topics includes "Academic Programs", "Best Practices", "Bibliography", "Consortium Members", "Employment and Services", "Information Networks", and "Suggested Improvements to the System". The user could choose the "Academic Programs" topic, select the "Massachusetts Institute of Technology" subtopic, and then explore the different course listings, departmental programs and research programs with an environmental aspect.

At this point the user has a variety of options before moving on to another topic. He or she can respond to questions embedded in the information pages (such as whether to be placed on a mailing list for additional information). The user can also evaluate and comment on the presentation of the topic, and thereby influence whether or not it will be retained into the next generation. Another option is to insert proposed new pages of information or even additional related subtopics. The proposed additions can also contain embedded questions, and will also be subject to evaluation and comments.

The system coordinator compiles all responses and makes comments available to the relevant authors for review. After either manually or algorithmically determining the "best" versions and alternates of the knowledge base from the evaluations provided by the analysts, the next generation is distributed and undergoes another cycle of review.

Design choices reflect the objective to achieve a clean, simple and cost-effective system. While there is a login sequence to identify responders, security is provided by transmission of diskettes to and from known groups ineligible to sign with other users' ids. While proposed topics and pages of information are available to all users for review, comments are only made available to the relevant authors. This preserves the independence of future comments and simplifies processing, but at the expense of intellectual interaction. The algorithms to "score" the topics and pages of information are straightforward functions of quality and quantity, subject to parameter-tuning or even manual override in practice. Finally, pop-up windows for simultaneous topics, help screens or glossaries may be desirable.

4. Operation of the Sustainable Development Server(tm) (an adaptive knowledge base to further the pursuit of sustainable development)

A. From the Perspective of an Individual User

Each user is provided a diskette containing the executable module "sds.exe", and a hierarchical data base of sustainable development information contained in directory "sds". The user first copies these onto disk when available, and then types:

sds

The system then prompts as follows:

Enter disk drive for sds file [e.g., 'c:']:

Enter directory of sds file [e.g., 'sds']:

In each case, the suggested answers constitute an appropriate default.

At this point, the program displays the top of the hierarchical "table of contents" in "page mode", and awaits user commands (see sections 5 and 6).

Upon completion of the user's review, the data base will include his or her evaluations and proposed changes. The user then copies the data base back to diskette and forwards it to the system coordinator for compilation and analysis.

B. From the Perspective of the System Coordinator

The job of the system coordinator can be parsed into a series of tasks:

i) The current version of the executable program file and the hierarchical data base is distributed to a select set of interested and knowledgeable users.

ii) The users explore those portions of the data base which are of relevance and interest to them. In the process, they have the ability to enter their opinions for the values of variables, to evaluate and comment on topic layouts and page contents, and to propose additions, replacements or deletions to topics and/or pages.

Note that the security system amounts to the transmission of the diskette to and from known users. The software supports the ability for each distributee to circulate the original diskette or a copy of it among additional users (who would have the same ability). However, since all the users of a given physical diskette would have the ability to alter or override each other's responses, this should be limited to knowledgeable and interested persons in a position of privacy to the original distributee.

In addition, where the system is used in a "closed end" automatic optimization mode, where the evaluations of a known set of users determine the versions preserved into subsequent distribution cycles, if the distributee includes additional users then a single "optimal" representation of the distributee's entire group can be formulated.

iii) The diskettes are returned to the system coordinator, who aggregates them by copying directories and files onto a disk partition, and then onto a composite diskette or diskettes. The composite diskette(s) are then redistributed for evaluation and comment. Note that if necessitated by the quantity of information, different subsets of the composite data base can be distributed to different users for this evaluation phase.

iv) A single diskette is then prepared for each user, containing his or her own topic setup and page contents, in addition to all evaluations, comments and entries for values of variables.

This user is then given an opportunity to make modifications based on that feedback, and return a new version to the system coordinator.

v) The system coordinator again copies directories and files onto a disk partition, and then runs the following modules when available:

"vacuum", which cleans out all unused files and directories;

"evaluate", an optional step which tags the nodes of the hierarchical data base with values calculated according to the scoring parameters and algorithms;

"select", which copies to diskette(s) several versions: the "optimal thread" through the hierarchical data base for each of the last N generations (with ids of G1, . . . , GN) and all contributions from the H highest-scoring users in the current generation.

vi) The selected versions are then distributed at the start of a new "generation", corresponding to step (i).

vii) For implementation on an electronic network physical distribution of diskettes is unnecessary, and standard security procedures for access and login would apply.

5. User Commands Available in Topic Mode

Topic mode displays and supports alteration of the hierarchical organization of topics covered in the system. It can be thought of as an interactive, hierarchical table of contents.

A series of commands is available in topic mode:

Topic

Syntax: T or Txx where xx is between 0 and the number of available topics at this level in the hierarchy. Note that in this and subsequent commands, either capitals or the lower case is acceptable.

This command allows a user to move about in the organizational hierarchy of topics.

T steps up one level in the hierarchy by invoking the next higher topics.

T0 reverts to the top of the hierarchy by invoking the root topics.

Txx selects the specified topic from among the displayed selections.

Error Conditions:

If xx specifies an unavailable topic, the user is notified and prompted to try again.

Add

Syntax: A or Axx where xx is between 0 and the number of topics available at this level in the hierarchy.

This command allows a user to add a topic at the current level in the hierarchy.

A appends a new topic after existing topics.

Axx adds a new topic before topic number xx, except "A0" is equivalent to "A".

After creating the new topic, the user is prompted to enter its heading.

Error Condition:

1. If xx specifies an unavailable topic, the user is notified and prompted to try again.

2. While one user may view another user's topic organization, modification of it is not allowed.

Replace

Syntax: Rxx where xx is between 1 and the number of topics available at this level.

This command allows a user to replace a topic in the current level in the hierarchy.

After deleting the current version of the topic, the user is prompted to enter the heading of the replacement version.

Error Conditions:

1. If xx specifies an unavailable topic, the user is notified and prompted to try again.

2. While one user may view another user's topic organization, modification of it is not allowed.

Delete

Syntax: Dxx where xx is between 1 and the number of topics available at this level.

This command allows a user to delete a topic in the current level in the hierarchy.

Error Conditions:

1. If xx specifies an unavailable topic, the user is notified and prompted to try again.

2. While one user may view another user's topic organization, modification of it is not allowed.

Heading

Syntax: H

This command allows a user to change the heading of the current topic.

The user is prompted to enter the new heading of the current topic.

Note: to change the heading of one of the subtopics available from the current topic, that topic must first be invoked with the "Topic" command before using the "Heading" command. While that topic could have been deleted without changing to it, its contents or "pages" of information would have been lost.

Error Condition:

A user is not allowed to modify another user's topic.

Eval

Syntax: E

This command allows a user to evaluate the organization of the current topic, and to enter any comment on it.

The program first requests an evaluation as follows:

Please evaluate this topic (1=very poor, 5=very good):

The user has the option to enter a number from 1 to 5, with 3 being neutral.

The program then requests any comment:

Please enter any comment on this topic:

The user then has the option to enter a comment, terminated by a "carriage return" or "enter" keystroke.

Error Condition:

If the logged-on user is in his or her own setup, the Eval command is unavailable.

Page Mode

Syntax: P

This command allows the user to switch from topic mode to page mode. Topic mode is used to view or alter the organization or hierarchy of the information base, while page mode is used to view or alter the actual contents of a particular topic in the hierarchy.

User

Syntax: U or Uid;

where id corresponds to the character string identifying a particular user.

If "U" is entered without an id, the system presents the id and name of each available user, providing an opportunity to select each in turn.

If "U" is entered with an id, the system verifies the id is accessible and then displays the topics according to that user.

If the id specified in the "U" command does not correspond to that of the logged-on user, he or she will be prevented from executing Add, Replace, Delete or Heading commands.

On the other hand, if the id specified in the "U" command corresponds to that of the logged-on user, he or she will be given an opportunity to "adopt" the organization or contents, for the current topic, of the user previously being presented.

The system first informs the logged-on user whether he or she already has a personally customized setup for the organization of the current topic. It then asks whether the logged-on user wishes to "adopt" as his or her own, and therefore accessible to future revision, the topic organization of the user previously being presented.

The system then informs the logged-on user whether he or she already has a personally customized setup for the page layout and contents of the current topic. It then asks whether the logged-on user wishes to "adopt" as his or her own, and therefore accessible to future revision, the page layout and contents of the user previously being presented.

Quit

Syntax: Q

This command gracefully terminates operation of the program, returning the user to the operating system.

6. User Commands Available in Page Mode

Page mode displays and supports alteration of the contents of pages of information relevant to the current topic within the hierarchical data base. The topic can be thought of as part of the table of contents, while the pages are the actual information so addressed.

A series of commands is available in page mode:

Page

Syntax: P or Pxx where xx is between 0 and the number of available pages at this level in the hierarchy.

P increments the page counter to display the contents of the next page, and is invalid if the last page is already being displayed.

Pxx displays the contents of the specified page, except that P0 has the same effect as P.

Error Conditions:

If xx specifies an unavailable page, the user is notified and prompted to try again.

Add, Replace, Delete, Eval

These commands are exactly analogous in form and function to their usage in topic mode, except that in page mode they refer to the appropriate page associated with the current topic.

Topic Mode

Syntax: T

This command allows the user to switch from page mode to topic mode. Topic mode is used to view or alter the organization or hierarchy of the information base, while page mode is used to view or alter the actual contents of a particular topic in the hierarchy.

User

This command allows the logged-on user, who is accessing the page contents of a second user's (or his or her own) topic setup as determined by the latest User command in topic mode, to view the entries of still a third user for the values of variables embedded in the page.

While the User command in page mode does not invoke a different user's organization or contents, the form and usage are exactly analogous to that in topic mode.

Values

Syntax: V

Each page can contain a series of variables embedded within the text, as demarcated by a pair of braces "{ . . . }". This command allows each logged-on user to enter his or her own judgment as to the best values for those variables.

The program will highlight each variable in turn, and prompt the user for a new entry. The user need not enter a value for all or any variables. On the other hand, if a user's judgment should change, additional subsequent entries supersede earlier ones.

Quit

This command is equivalent in form and function to its usage in topic mode.

7. Knowledge Base Adaptation

A. Parameters Used to Evaluate Alternative Versions

The scoring algorithms rely on the evaluation of topics and pages. Three parameters are used in the process of transforming the set of evaluations into composite scores.

The first parameter relates to the issue of quality versus quantity. A purely "intensive" scoring system would score ten high quality pages of Information equally to one such page. On the other hand, a purely "extensive" scoring system would score two mediocre pages twice as high as one.

On the assumption that the value of the data base is a combination of its quality and quantity, the parameter "extensivity" achieves this as follows:

value=(quality score)×(measure of quantity)^{extensivity} where both the quality score and the measure of quantity are greater than or equal to one, and the extensivity parameter is in the range from 0 (i.e., only quality matters) to 1 (i.e., the score is proportional to quantity).

Parameter "content" fixes relative weights of organization and content:

topic value=("content")×(evaluation of aggregated subtopic content)+(1−"content")×(evaluation of organization)

where the parameter "content" is between 0 (i.e., only organization matters) and 1 (i.e., only content matters).

The final parameter "persist" increases the valuation of each component of the benchmark version, to require that a threshold of improvement be exceeded before changes are adopted:

(benchmark valuation)=(benchmark valuation)(1+"persist"/100)

B. Algorithms Used to Evaluate Alternative Versions

The scores of topics are built up from the scores of components such as subtopics and pages.

The score of any given page [VAL(page)] is the average of all submitted evaluations. The score of the set of pages ("PMAP") constituting the content of a topic is:

VAL(PMAP)=(average VAL(page))×(number of pages)^extensivity

The value of a set of subtopics is then:

VAL(subtopics)=(average VAL(PMAP))×(number of subtopics)^{extensivity}

The value of a topic can then be calculated as:

VAL(topic)=("content")×(VAL(subtopics))+(1−"content")×(VAL(SMAP))

where SMAP is a given arrangement of subtopics, and VAL(SMAP) is the average evaluation of that organization.

Adaptive Knowledge Base US Serial Number 08/476,483

Sample Screens

```
Sustainable Development Server(tm)  page 1 of 2 Mon Aug 30 22:31:10 1993
            Sustainable Development Server(tm)    Version 1.0
--You are sys mgr, looking at the primary version, with default values--

Sustainable Development Server(tm), copyright William J. Hartnett, 1993

This collaborative knowledge base is designed to support the pursuit
of sustainable development. It includes a hierarchical table of contents
of "topics", with information contained in corresponding "pages".

The initial knowledge base will include information on academic programs,
best practices, bibliography, employment, information networks, and
suggestions for improvements to the system.

[... Look to the bottom line for command options.  For example, to see
    the next page type "P"; and to switch to topic mode type "T" ...]


Enter command: P

Page   Add   Replace  Delete  Values   Eval  Screen  User    Quit
1- 2   1- 2   1- 2     1- 2                   mode   [id]
```

```
Sustainable Development Server(tm)  page 2 of 2 Mon Aug 30 22:31:17 1993
            Sustainable Development Server(tm)   Version 1.0
--You are sys mgr, looking at the primary version, with default values--

This collaborative knowledge base is designed to be systematically updated.

The software supports the ability of users to evaluate and comment upon
individual screens and pages.  Users can also propose additions,
replacements and deletions of individual screens and pages.

User evaluations determine which parts of the collaborative knowledge base
are sufficiently "adaptive" to survive into the next generation.

Proposed changes are included as alternatives which compete with the
new primary version.

[...To see what topics are available, switch to topic mode by typing "T"...]

Enter command: T

Page   Add   Replace  Delete  Values   Eval  Screen  User    Quit
1- 2   1- 2   1- 2     1- 2                   mode   [id]
```

Adaptive Knowledge Base US Serial Number 08/476,483

```
Sustainable Development Server(tm)           Mon Aug 30 22:35:27 1993
             Sustainable Development Server(tm)    Version 1.0
--You are sys mgr, looking at the primary version, with default values--
T  for next higher topics;    T0 for root topics;    P  for page contents

T1 Academic Programs
T2 Best Practices
T3 Bibliography
T4 Consortium Members
T5 Employment and Services
T6 Information Networks
T7 Suggested Improvements to the System


Enter command: T1

Topic  Add   Replace  Delete  Heading   Eval  Page   User    Quit
0- 7   1- 7    1- 7     1- 7                  mode   [id]
```

Adaptive Knowledge Base US Serial Number 08/476,483

```
Sustainable Development Server(tm)            Mon Aug 30 22:52:26 1993
                           Academic Programs
--You are sys mgr, looking at the primary version, with default values--
T  for next higher topics;   T0 for root topics;   P  for page contents

T1 California Institute of Technology
T2 Massachusetts Institute of Technology


Enter command: P

Topic  Add   Replace  Delete  Heading   Eval  Page   User    Quit
0- 2   1- 2   1- 2     1- 2                    mode   [id]
```

Adaptive Knowledge Base US Serial Number 08/476,483

```
Sustainable Development Server(tm)  page 1 of 1 Mon Aug 30 22:53:02 1993
                             Academic Programs
--You are sys mgr, looking at the primary version, with default values--

A wide range of academic programs supports the pursuit of sustainable
development.  These can be categorized as degree programs and research
programs.

Degree programs are available at the undergraduate and graduate levels,
in departments ranging from law, public policy or political science to
science or engineering.

Academic research programs focus faculty, staff and student resources
on different issues relating to sustainable development.



Enter command: T, T2

Page   Add   Replace  Delete  Values   Eval  Screen  User    Quit
1- 1   1- 1   1- 1     1- 1                   mode   [id]
```

Adaptive Knowledge Base US Serial Number 08/476,483

```
Sustainable Development Server(tm)           Mon Aug 30 22:53:15 1993
                 Massachusetts Institute of Technology
--You are sys mgr, looking at the primary version, with default values--
T  for next higher topics;   T0 for root topics;   P  for page contents

T1 MIT Environmental Course Listings
T2 MIT Departmental Programs with Environmental Aspects
T3 MIT Research Programs Involving the Environment

Enter command: T1

Topic  Add   Replace  Delete  Heading   Eval  Page   User    Quit
0- 3   1- 3   1- 3     1- 3                   mode   [id]
```

Adaptive Knowledge Base US Serial Number 08/476,483

```
Sustainable Development Server(tm)           Mon Aug 30 22:58:06 1993
                    MIT Environmental Course Listings
--You are sys mgr, looking at the primary version, with default values--
T  for next higher topics;   T0 for root topics;   P  for page contents

T1 1.725J Chemicals in the Environment: Fate and Tansport
T2 1.811J Environmental Law: Pollution Control
T3 1.812J Regulation of Chemical Toxins, Radiation, and Biotechnology
T4 1.972 Environmental Restoration Engineering
T5 3.576J Law, Technology, and Public Policy
T6 10.72J Chemicals in the Environment:  Sources and Control
T7 10.805J Technology, Law, and the Working Environment
T8 11.328J Science and Technology in International Affairs
T9 11.334 Environmental Pollution: Problems, Solutions, and Policy
T10 11.361 Environmental Policy and Regulation
T11 11.362 Environmental Management
T12 11.363J Chemicals in the Environment: Policy and Management
T13 11.364 International Environmental Negotiation
T14 12.300 Environmental Chemistry and Climate Change
T15 17.301/2 Science, Technology and Public Policy
Enter command: T2, P

Topic  Add   Replace  Delete  Heading   Eval  Page   User    Quit
0-18   1-18   1-18     1-18                   mode   [id]
```

Adaptive Knowledge Base US Serial Number 08/476,483

Sustainable Development Server(tm) page 1 of 1 Mon Aug 30 22:58:18 1993
1.811J Environmental Law: Pollution Control
--You are sys mgr, looking at the primary version, with default values--

Reviews and analyzes Federal and state regulation of air and water pollution and hazardous wastes. Emphasizes use of legal mechanisms and alternative approaches (such as economic incentives) to control pollution. Focuses on the major Federal legislation, the underlying administrative system, and the common law in analyzing the goals of pollution control, economic consequences, and the role of the courts. Discusses both classical pollutants and toxic industrial chemicals. Also provides an introduction to basic legal skills.

N.A. Ashford, C.C. Caldart

Enter command: T, T, T, T2

| Page | Add | Replace | Delete | Values | Eval | Screen | User | Quit |
|---|---|---|---|---|---|---|---|---|
| 1- 1 | 1- 1 | 1- 1 | 1- 1 | | | mode | [id] | |

Adaptive Knowledge Base US Serial Number 08/476,483

```
Sustainable Development Server(tm)            Mon Aug 30 23:06:55 1993
          MIT Departmental Programs with Environmental Aspects
--You are sys mgr, looking at the primary version, with default values--
T  for next higher topics;   T0 for root topics;   P  for page contents

T1 Civil and Environmental Engineering
T2 Earth and Atmospheric Sciences
T3 Division of Toxicology
T4 Urban Studies and Planning
T5 School of Engineering
T6 School of Science
T7 Sloan School of Management
T8 Woods Hole/MIT Joint Program in Oceanography and Oceanographic Engineering
T9 MIT Technology and Policy Program


Enter command: T9, P

Topic  Add   Replace  Delete  Heading   Eval  Page   User    Quit
0- 9   1- 9   1- 9     1- 9                   mode   [id]
```

Adaptive Knowledge Base US Serial Number 08/476,483

Sustainable Development Server(tm) page 1 of 1 Mon Aug 30 23:07:24 1993
MIT Technology and Policy Program
--You are sys mgr, looking at the primary version, with default values--

The Technology and Policy Program is an interdisciplinary graduate program designed for "engineers and scientists with a difference", professionals with a strong technical foundation who also have the ability to deal with important social concerns. Masters and doctoral students in the program work on problems covering the wide range of technical fields available at MIT, including environmental studies.

The curriculum has two parallel tracks, one with a focus on engineering and the physical sciences and one with a focus on the social sciences. The curricula of both tracks include three subjects in policy analysis and three subjects in an integrated core selected by the student and his or her advisor. Thesis topics are often based on research projects that include both technical and policy components. Typical topics in environmental studies include priority setting and enforcement in hazardous waste remediation, water conservation and pricing, and the economic and environmental impacts of alternative energy policies. Faculty comes from Engineering, Political Science and Urban Studies.

Enter command: T, T0, T3

| Page | Add | Replace | Delete | Values | Eval | Screen | User | Quit |
|---|---|---|---|---|---|---|---|---|
| 1- 1 | 1- 1 | 1- 1 | 1- 1 | | | mode | [id] | |

Adaptive Knowledge Base US Serial Number 08/476,483

```
Sustainable Development Server(tm)            Mon Aug 30 23:09:14 1993
                              Bibliography
--You are sys mgr, looking at the primary version, with default values--
T  for next higher topics;   T0 for root topics;   P  for page contents

T1 Author Listings
T2 Solow Literature Search (By Author)
T3 Right to Development
T4 Structured Bibliography


Enter command: T1, F, F, F

Topic  Add   Replace  Delete  Heading   Eval  Page   User    Quit
0- 4   1- 4    1- 4     1- 4                  mode   [id]
```

Adaptive Knowledge Base US Serial Number 08/476,483

```
Sustainable Development Server(tm)          Mon Aug 30 23:19:04 1993
                           Author Listings
--You are sys mgr, looking at the primary version, with default values--
T  for next higher topics;   T0 for root topics;   P  for page contents
T211 Meadows, D., Smart Development, Not Dumb Growth
T212 Mendes, C., Fight for the forest.
T213 Merchant, C., Radical ecology: the search for a livable world.
T214 Mikesell, R., Economic development and the environment: a comparison of sus
T215 Minkow, D.; Murphy-Dunning C., Assault on Papua New Guinea.
T216 Miyamoto, J., Tackling Environmental Issues in Companies
T217 Molino, M., Debt-for_nature Exchanges: Attempting to Deal Simultaneously wi
T218 Morandini, N., La cumbro de Rio fue un rugido de raton.
T219 Mourmouras, A., Competitive Equilibria and Sustainable Growth in a Life-Cyc
T220 Muntaz, S.; Durr-e-Nayab, Management Arrangements of the Chapr
T221 Musu, I., Economie e ambiante. (Economics and Environment. With English sum
T222 Myers, N., The Environmental Basis of Sustainable Development
T223 Newall, j., The Challenge of Competitiveness
T224 Nicolaisen, J.; Moeller, P., Org. for Econ. Coop. and Development. Dept. of
T225 Nijkamp, P.; van den Bergh, J.; Seeteman, F.; Parikh, K.; Magrath, W., Regi
Enter command: T211, P

Topic  Add    Replace  Delete  Heading  Eval  Page  User  Quit
0-356  1-356  1-356    1-356                  mode  [id]
```

Adaptive Knowledge Base US Serial Number 08/476,483

Sustainable Development Server(tm) page 1 of 2 Mon Aug 30 23:39:55 1993
Meadows, D., Smart Development, Not Dumb Growth
--You are sys mgr, looking at the primary version, with default values--

Full Citation:

Meadows, D., "Smart Development, Not Dumb Growth", 95(6) Technology Review 68-69 (Aug/Sep 1992).

Enter command: P

| Page | Add | Replace | Delete | Values | Eval | Screen | User | Quit |
|---|---|---|---|---|---|---|---|---|
| 1- 2 | 1- 2 | 1- 2 | 1- 2 | | | mode | [id] | |

Adaptive Knowledge Base US Serial Number 08/476,483

Sustainable Development Server(tm) page 2 of 2 Mon Aug 30 23:40:02 1993
Meadows, D., Smart Development, Not Dumb Growth
--You are sys mgr, looking at the primary version, with default values--

Abstract (ABI): The recent US history of stimulating economic growth at any cost is precisely what has created the current difficulties. Smart development build s on a region's unique skills and resources and encourages durable local busines s, while dumb growth entices a big corporation, which exerts control from outsid e, drains profits back outside, undercuts local manufacturers, and lays off hund reds of people without warning. Dumb growth also disregards many infrastructure investments becuase they do not pay off visibly enough or soon enough. Drawing a distinction between sustainable development and unsustainable growth does not m ean being anti-economic; it means being practical and creating an economy that d oes not delude itself with booms that create their own busts or with drawing dow n and polluting the resources of the earth upon which all economic activity depe nds.

Enter command: T, T0

| Page | Add | Replace | Delete | Values | Eval | Screen | User | Quit |
|---|---|---|---|---|---|---|---|---|
| 1- 2 | 1- 2 | 1- 2 | 1- 2 | | | mode | [id] | |

```
Sustainable Development Server(tm)            Mon Aug 30 23:41:14 1993
            Sustainable Development Server(tm)   Version 1.0
--You are sys mgr, looking at the primary version, with default values--
T  for next higher topics;   T0 for root topics;   P  for page contents

T1 Academic Programs
T2 Best Practices
T3 Bibliography
T4 Consortium Members
T5 Employment and Services
T6 Information Networks
T7 Suggested Improvements to the System




Enter command: T4

Topic  Add   Replace  Delete  Heading   Eval  Page   User    Quit
0- 7   1- 7    1- 7     1- 7                  mode   [id]
```

Adaptive Knowledge Base US Serial Number 08/476,483

```
Sustainable Development Server(tm)          Mon Aug 30 23:41:25 1993
                          Consortium Members
--You are sys mgr, looking at the primary version, with default values--
T  for next higher topics;   T0 for root topics;   P  for page contents

T1 Academe
T2 Government
T3 Industry
T4 International Agencies
T5 Non-Governmental Agencies (NGOs)


Enter command: T, T5

Topic  Add   Replace  Delete  Heading   Eval  Page   User    Quit
0- 5   1- 5   1- 5     1- 5                   mode   [id]
```

```
Sustainable Development Server(tm)           Mon Aug 30 23:41:35 1993
                          Employment and Services
--You are sys mgr, looking at the primary version, with default values--
T  for next higher topics;   T0 for root topics;   P  for page contents

T1 Consultancies
T2 Law Firms
T3 Positions Available

Enter command: T, T6

Topic  Add   Replace  Delete  Heading   Eval  Page   User    Quit
0- 3   1- 3   1- 3     1- 3                   mode   [id]
```

Adaptive Knowledge Base US Serial Number 08/476,483

```
Sustainable Development Server(tm)            Mon Aug 30 23:41:45 1993
                          Information Networks
--You are sys mgr, looking at the primary version, with default values--
T  for next higher topics;   T0 for root topics;   P  for page contents

T1 On-line Computer Networks
T2 Off-line Computer Networks
T3 Other Information Networks


Enter command: Q

Topic  Add   Replace  Delete  Heading   Eval  Page   User    Quit
0- 3   1- 3   1- 3     1- 3                   mode   [id]
```

Having now described a few embodiments of the invention, it should be apparent to those skilled in the art that the foregoing is merely illustrative and not limiting, having been presented by way of example only. Numerous modifications and other embodiments, including combinations of features found in the illustrated embodiments, are within the scope of one of ordinary skill in the art and are contemplated as falling within the scope of the invention as defined by the claims.

I claim:

1. A method of operating a computerized adaptive knowledge base which evolves over a plurality of iterations, evolution of the adaptive knowledge base being based on user evaluations and on user proposed contributions, comprising the steps of:

executing software on the computer to receive from multiple users proposed contributions to the adaptive knowledge base;

executing software on the computer to collect from multiple users evaluations of organization and contents of the adaptive knowledge base, including the proposed contributions;

storing in the adaptive knowledge base the evaluations collected;

associating the evaluations collected with the organization and the contents evaluated;

computing total evaluation functions based upon the evaluations collected;

storing in the adaptive knowledge base the total evaluation functions computed for one of the plurality of iterations;

associating the total evaluation functions computed with the organization and the contents evaluated; and selecting those portions of the adaptive knowledge base to preserve in a next iteration, based on the total evaluation functions.

2. The method of claim 1, wherein the evaluations include a quality score equal to the average of user evaluations and a quantity score equal to the amount of information and an evaluation function computed includes a predetermined extensivity parameter and is defined as:

$$(\text{quality score})^{(1-\text{extensivity})}\times(\text{quantity score})^{\text{extensivity}}$$

and wherein the evaluation functions computed include content evaluations and organizational evaluations, and a total evaluation function computed includes a predetermined content parameter and is defined as:

$$\{(\text{content})\times(\text{content evaluation})\}+\{(1-\text{content})\times(\text{organization evaluation})\}.$$

3. A method of managing a data base using a computer which provides a user access to entries therein based on estimates of the user's own evaluations, comprising the steps of:

controlling the computer with software to correlate in a memory in the computer the user's past actual evaluations of entries with evaluations of those entries by other users; and controlling the computer with software to estimate the user's evaluations for an entry for which the user has not entered an actual evaluation on the basis of the correlations in the memory.

4. A method of managing a data base using a computer which provides a user access to entries therein based on estimates of the user's own evaluations, comprising the steps of:

controlling the computer with software to perform one of maximum likelihood estimation analysis, Tobit analysis, logit analysis, probit analysis and regression analysis of the user's past actual evaluations of entries against the evaluations of those entries by other users; and controlling the computer with software to estimate the user's evaluations for an entry for which the user has not entered an actual evaluation on the basis of the analysis performed.

5. The method of claim 4, wherein the step of controlling to estimate further comprises the steps of:

storing in a memory an evaluation array $E_{ij}$, where i is a user index and j is an observation index;

storing in a memory a weight array $W_{uj}=1+|E_{uj}-E_j|^{\alpha}$, where u is a value of the user index representative of the user, $\alpha$ is a user-specified parameter having a default value of 0, and $E_j$ is an average of evaluations for observation j; and for each observation j lacking an evaluation by the user, operating the computer to compute:

$$E_{uj}=\frac{\sum_{i\neq u}\left\{|r_i|^{\beta}\left[\sum_j W_{ij}\right]^{\gamma}(m_iE_{ij}+b_i)\right\}}{\sum_{i\neq u}\left\{|r_i|^{\beta}\left[\sum_j W_{ij}\right]^{\gamma}\right\}},$$

$r_j$ is a correlation coefficient for a user i from a linear regression of $E_{uj}$ against $E_{ij}$ with weights $W_{ij}$, where $W_{ij}=W_{uj}$ if there is an observation for $E_{ij}$ and $W_{ij}=0$ otherwise, $\beta$ is a user-specifiable parameter having a default value of 1, $\gamma$ is a user-specifiable parameter having a default value of 1, $(m_iE_{ij}+b_i)$ is an estimate of $E_{uj}$ calculated from coefficients $m_i$ and $b_i$ of the linear regression of $E_{uj}$ against $E_{ij}$ with weights $W_{ij}$, and the summations $\Sigma_{i\neq u}$ include all users i for which evaluation $E_{ij}$ is present and for which a number of observations in common with user u to perform the linear regression of $E_{uj}$ against $E_{ij}$ with weights $W_{ij}$ exceeds a predetermined threshold.

6. A method of managing a data base using computers, wherein the data base is distributed by segments to a plurality of computers operated by individual users based on their expressions of interest in different components of the data base, comprising the steps of:

controlling each of the plurality of computers to permit the user to tag portions of the data base with indicators of interest;

controlling each of the plurality of computers to permit the user to specify the quantity of information from the data base to be received in response to a query; and distributing segments of the data base to each of the plurality of computers in accordance with a probabilistic function of the user's indicators of interest and quantities specified.

7. A computerized adaptive knowledge base system, wherein the adaptive knowledge base evolves over a plurality of iterations, evolution of the adaptive knowledge base being based on user evaluations and on user proposed contributions, comprising:

a computer executing software for receiving from multiple users proposed contributions to the adaptive knowledge base;

the computer further executing software for collecting from multiple users evaluations of organization and contents of the adaptive knowledge base, including the proposed contributions;

means for storing in the adaptive knowledge base the evaluations collected;

means for associating the evaluations collected with the organization and the contents evaluated;

means for computing evaluation functions based upon the evaluations collected;

means for storing in the adaptive knowledge base the evaluation functions computed for one of the plurality of iterations;

means for associating the evaluation functions computed with the organization and the contents evaluated; and means for selecting those portions of the adaptive knowledge base to preserve in a next iteration, based on the evaluation functions.

8. The system of claim 7, wherein the evaluations include a quality score equal to the average of user evaluations and a quantity score equal to the amount of information and the evaluation function computed includes a predetermined extensivity parameter and is defined as:

$(\text{quality score})^{(1-extensivity)} \times (\text{quantity score})^{extensivity}$ and wherein the evaluations include content evaluations and organizational evaluations, and the evaluation function computed includes a predetermined content parameter and is defined as:

$\{(\text{content}) \times (\text{content evaluation})\} + \{(1-\text{content}) \times ([\text{origination}]\ \text{organization evaluation})\}$.

9. A system for managing a data base using a computer which provides a user access to entries therein based on estimates of the user's own evaluations, comprising:

means for correlating in a memory in the computer the the user's past actual evaluations of entries with evaluations of those entries by other users;

means for estimating the user's evaluations for an entry for which the user has not entered an actual evaluation on the basis of the correlations in the memory.

10. A system for managing a data base using a computer which provides a user access to entries therein based on estimates of the user's own evaluations, comprising:

means for performing one of maximum likelihood estimation analysis, Tobit analysis, logit analysis, probit analysis and regression analysis of the user's past actual evaluations of entries against the evaluations of those entries by other users; and means for estimating the user's evaluations for an entry for which the user has not entered an actual evaluation on the basis of the analysis performed.

11. A system for managing a data base using computers, wherein the data base is distributed by segments to a plurality of computers operated by individual users based on their expressions of interest in different components of the data base, comprising:

means for controlling each of the plurality of computers to permit the user to tag portions of the data base with indicators of interest;

means for controlling each of the plurality of computers to permit the user to specify the quantity of information from the data base to be received in response to a query; and means for distributing segments of the data base to each of the plurality of computers in accordance with a probabilistic function of the user's indicators of interest and quantities specified.

12. A method of operating a computerized adaptive knowledge base which evolves over a plurality of iterations, evolution of the adaptive knowledge base being based on user evaluations and on user proposed contributions, comprising the steps of:

executing software on the computer to receive from multiple users proposed contributions to the adaptive knowledge base;

executing software on the computer to collect from multiple users evaluations of portions of the adaptive knowledge base, including the proposed contributions;

storing in the adaptive knowledge base the evaluations collected;

associating the evaluations collected with the portions evaluated; and selecting those portions of the adaptive knowledge base to preserve in a next iteration, based on the evaluations.

13. A method of operating a computerized adaptive knowledge base which evolves over a plurality of iterations, evolution of the adaptive knowledge base being based on user evaluations and on user proposed contributions, comprising the steps of:

executing software on the computer to receive from multiple users proposed contributions to the adaptive knowledge base, including both contents and organization;

executing software on the computer to collect from multiple users evaluations of the contents and alternative organizations of the adaptive knowledge base, including the proposed contributions;

storing in the adaptive knowledge base the evaluations collected;

associating the evaluations collected with the contents and organizations evaluated; and selecting those contents and alternative organizations of the adaptive knowledge base to preserve in a next iteration, based on the evaluations.

14. A method of operating a computerized data base with a plurality of users, by which users can adapt the keyword access, comprising the steps of:

providing users the capability to select as a starting keyword template any already available set of keywords and any associated structure;

providing users the capability to modify said keyword template by specifying additional keywords, where the default initialization of whether an entry in the data base matches the additional keywords is able to be specified as a function of the frequency of patterns of words or phrases in said entry, with said default initialization able to be manually overridden for specific entries in the data base;

providing users the capability to modify said keyword template by changing any associated structure; and providing users the capability to make the adapted keyword access available to other users.

* * * * *